(12) United States Patent
Umemoto et al.

(10) Patent No.: US 6,483,199 B2
(45) Date of Patent: Nov. 19, 2002

(54) WIND POWER GENERATING DEVICE

(75) Inventors: Toshiyuki Umemoto, Tokyo (JP); Yuji Ikeda, Tokyo (JP); Ryoji Nagatani, Tokyo (JP); Satoru Kotoh, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 61 days.

(21) Appl. No.: 09/839,116

(22) Filed: Apr. 23, 2001

(65) Prior Publication Data

US 2001/0035651 A1 Nov. 1, 2001

(30) Foreign Application Priority Data

Apr. 28, 2000 (JP) ........................................ 2000-130941

(51) Int. Cl.[7] .............................................. F03D 11/00
(52) U.S. Cl. ........................................ 290/55; 290/54
(58) Field of Search ............................... 290/43, 44, 54, 290/55; 416/147

(56) References Cited

U.S. PATENT DOCUMENTS

| | | | | |
|---|---|---|---|---|
| 4,059,969 | A | * 11/1977 | Awalt, Jr. ..................... | 122/26 |
| 4,299,198 | A | * 11/1981 | Woodhull ..................... | 126/247 |
| 5,281,094 | A | * 1/1994 | McCarty et al. .............. | 318/722 |
| 6,067,227 | A | * 5/2000 | Katsui et al. ................ | 165/80.3 |
| 6,278,197 | B1 | * 8/2001 | Appa ........................... | 290/54 |
| 2001/0040062 | A1 | * 11/2001 | Illingworth .................. | 180/627 |

FOREIGN PATENT DOCUMENTS

| | | |
|---|---|---|
| JP | 58-65977 | 4/1983 |
| JP | 62-9746 | 3/1987 |
| JP | 70154946 | 6/1995 |
| JP | 10-325499 | 12/1998 |

* cited by examiner

*Primary Examiner*—Nicholas Ponomarenko
(74) *Attorney, Agent, or Firm*—Leydig, Voit & Mayer, Ltd.

(57) ABSTRACT

A hub, to which three blades receiving wind are fixed and extending in a radial direction of the hub at equal intervals. The hub is arranged in a spindle-shaped boss having a rectification function. A cylindrical frame is arranged on the leeward side of the boss to separate an outer peripheral surface of a generator from outside air. An outer surface of the boss, which rotates with the blades, and an outer peripheral surface of the frame form a continuous plane. On the outer peripheral surface of the frame, fins, which outwardly protrude in a radial direction of the frame and extend in an axial direction of the frame, are arranged in a circumferential direction of the frame at equal intervals. After the outside air rotates the blades, the outside air passes along the fins. Therefore, heat, which is generated in the generator and is transferred to the fins through the frame by conduction, is dissipated to the outside air. Accordingly, the temperature of the generator can be reliably maintained at a value equal to or lower than a standard value, and a wind power generating device having a simple cooling structure can be manufactured.

20 Claims, 18 Drawing Sheets

WIND POWER GENERATING DEVICE

BACKGROUND OF THE INVENTION

1. Field of the Invention

The present invention relates to a wind power generating device having a cooling structure.

2. Description of Related Art

In a general wind power generating device, it is required to maintain the reliability of the device by efficiently dissipating heat generated in an electric power generator of the device to the outside and by decreasing temperature of the generator (or internal temperature of the device) to a prescribed allowable temperature or below. Therefore, in a conventional wind power generating device with a closed generator, an air blower is attached to a horizontal shaft to which a plurality of blades receiving wind power are fixed, outside air is supplied into the wind power generating device through an air supplying opening by using the air blower, and the generator functioning as a heat generating unit is cooled.

A conventional wind power generating device having the above-described cooling structure will be described below as an example. FIG. 30 is a sectional view showing a structure of a conventional wind power generating device disclosed in Published Unexamined Japanese Patent Application S58-65977 (1983), and FIG. 31 is an enlarged sectional view showing principal components of a cooling structure of the conventional wind power generating device shown in FIG. 30. In FIG. 30 and FIG. 31, referential numeral 1 denotes a pole which is vertically arranged in an elevated spot, a wind-strong spot of an island or a cape, an offshore spot with high wind activity or a coastal spot with high wind activity for example. A nacelle 2 is fixed to a top portion of the pole 1. An electric power generator described later is arranged in the nacelle 2. A hub 4 is arranged in a front space (that is, a windward-side space) of the nacelle 2. A plurality of blades 3 are fixed to the hub 4 and extend in a radial direction of the hub 3. The hub 4 is attached to a top portion of a horizontal shaft 6 which functions as a rotational shaft rotating a rotor (not shown) of a closed type generator 5. A step-up gear 7 and a brake 8 are attached to the horizontal shaft 6. The step-up gear 7 accelerates a rotational speed of the blades 3 and transmits the rotational motion of the blades 3 to the rotor. The brake 8 stops the rotation of the horizontal shaft 6. Also, an air blower 9 is attached to a top portion of the horizontal shaft 6. The air blower 9 forcibly ventilates the nacelle 2 to cool the closed type generator 5. An air supplying opening 10 is arranged in a bottom portion of the nacelle 2 placed in the neighborhood of the closed type generator 5, and outside air is supplied in the nacelle 2 through the air supplying opening 10. Also, an exhaust vent 11 is arranged in both a ceiling portion and another bottom portion of the nacelle 2 placed in the neighborhood of the air blower 9, and heat generated in the closed type generator 5 is dissipated to the outside through the exhaust vents 11. As shown in FIG. 31, each exhaust vent 11 is formed in a labyrinth structure, and a heat flow H is exhausted to the outside through the exhaust vents 11.

Because the conventional wind power generating device has the above-described cooling structure, air placed in the nacelle 2 is forcibly ventilated by using the air blower 9 attached to the horizontal shaft 6. Therefore, heat generated in the closed type generator 5 is dissipated to the outside, and this cooling structure can prevent the performance of the conventional wind power generating device from deteriorating due to the heat remaining in the nacelle 2. Also, because the air supplying opening 10 and the exhaust vents 11 have the above-described structure, the intrusion of rain or snow into the nacelle 2 can be prevented when rain or snow falls. Therefore, it is generally said that the structure of the air supplying opening 10 and the exhaust vents 11 can prevent the units placed in the nacelle 2 from being corroded.

There has been increasing demand in recent years for wind power generation due to the fact that large amounts of clean energy can be obtained by wind power generation. Therefore, this demand for wind power generation has lead to demand for wind power generation with a high output power, a high efficiency and a superior maintenance performance.

However, because the conventional wind power generating device has the above-described cooling structure, a part of the driving power obtained from the wind power in the blades 3 is consumed by the air blower. Therefore, there is a problem that an energy generation efficiency is lowered in the conventional wind power generating device.

Also, in the conventional wind power generating device having the above-described cooling structure, even though the structure of the air supplying opening 10 and exhaust vents 11 is skillfully designed, it is difficult to remove water and/or salt contained in the outside air, and the outside air containing water and/or salt is undesirably supplied into the nacelle 2. Therefore, it is difficult to completely prevent the units placed in the nacelle 2 from being corroded by the water and/or salt contained in the outside air, and there is a problem that corrosion treatment is required for the units other than the closed type generator 5.

In addition, in the conventional wind power generating device having the above-described cooling structure, in cases where a filter is arranged in the air supplying opening 10 to remove water and/or salt from the outside air supplied into the nacelle 2, maintenance working such as filter exchange is additionally required. Also, because each exhaust vent 11 is formed in the labyrinth structure, there is another problem that the structure of the nacelle 2 is complicated.

SUMMARY OF THE INVENTION

An object of the present invention is to provide, with due consideration to the problems of the conventional wind power generating device having the above-described cooling structure, a wind power generating device with a simple cooling structure in which an inside temperature is reliably maintained to a value equal to or lower than a standard value.

The object is achieved by the provision of a wind power generating device comprising a horizontal shaft arranged on a top portion of a pole vertically arranged so as to be directed to a windward side, a generator having both a rotor fixed on a leeward side of the horizontal shaft and a stator arranged on the outside of the rotor, a blade which is fixed to the horizontal shaft on the windward side of the horizontal shaft and is rotated by a wind power, and a cylindrical frame which separates the stator of the generator from outside air and has a heat dissipating function to dissipate heat, which is generated in the generator according to the rotation of the rotor of the generator, to the wind which gives a rotational force to the rotor through the blade.

In the above configuration, the heat generated in the generator is transferred to the cylindrical frame by conduction. Also, wind in the outside air, which has already given a rotational force to the rotor through the blade, collides with the cylindrical frame and flows along the cylindrical frame, and heat is dissipated from the cylindrical frame to the outside air.

Accordingly, a heat dissipating performance of the heat generated in the generator to outside air can be improved. Therefore, a temperature of units and the generator arranged in the wind power generating device can be reliably maintained to a value equal to or lower than a standard value.

Also, the wind power generating device does not have an air supplying opening, an exhaust vent or an air blower used in the prior art. The wind power generating device having the simple structure can be manufactured.

Also, because the heat generated in the generator is dissipated to the outside air which has already given a rotational force to the rotor through the blade, the driving power obtained from the wind power is not consumed for the cooling of the generator. Therefore, a high heat dissipating coefficient can be obtained, and the energy generation efficiency can be improved in the wind power generating device.

It is preferred that the heat dissipating function of the cylindrical frame is exerted by a fin which is outwardly arranged on the cylindrical frame in a radial direction of the cylindrical frame and extends in an axial direction of the cylindrical frame.

Therefore, because the fin is arranged on the cylindrical frame, a heat dissipating area, from which the heat is dissipated to outside air, can be increased, and a cooling performance for the generator can be considerably improved as compared with a case where no fin is arranged on the cylindrical frame.

It is also preferred that an angle between an extending direction of a front portion of the fin on the windward side and a rotational direction of the blade is set to an acute angle.

Therefore, in addition to the effect of the increase of the heat dissipating area, because a flow speed loss of the outside air at an inlet of the fin can be decreased, a flow rate of the outside air can be increased. Also, because the outside air having a motion component directed in a circle-circumferential direction of the wind power generating device (or a rotational direction of the blade) flows along side surfaces of the fin, a heat transfer coefficient from the outer surface of the fin to the outside air can be heightened, and the cooling performance for the generator can be improved.

It is also preferred that the fin is composed of a plurality of divided fins serially arranged in the axial direction of the cylindrical frame, and each pair of divided fins adjacent to each other are arranged at positions different from each other along a circle-circumferential direction of the cylindrical frame.

Therefore, in addition to the effect of the increase of the heat dissipating area, a plurality of areas, at which a heat transfer coefficient is heightened according to a boundary layer renewing effect, can be obtained along the flow direction of the outside air, and a high cooling performance for the generator can be obtained.

It is also preferred that an angle between an extending direction of the divided fin arranged on the windward side and a rotational direction of the blade is set to an acute angle.

Therefore, in addition to the effect of the increase of the heat dissipating area, because the outside air collides with one side surface of each divided fin following the divided fin arranged on the windward side, a boundary layer of the outside air becomes thinner, a plurality of areas, at which a heat transfer coefficient is heightened according to a boundary layer renewing effect, can be obtained in a wide region of the side surfaces of the divided fins. Therefore, the cooling performance for the generator can be improved.

It is also preferred that the wind power generating device further comprises a windward-side clamper arranged on the windward side of the cylindrical frame, and a leeward-side clamper arranged on the leeward side of cylindrical frame to put the stator of the generator between the windward-side clamper and the leeward-side clamper, wherein the height of an upper surface of the windward-side clamper is the same as that of an outer peripheral surface of the cylindrical frame, and the height of the fin is higher than that of an upper surface of the leeward-side clamper in the axial direction of the cylindrical frame.

Therefore, because the heat dissipating performance can be improved on the leeward side of the fin, a superior heat dissipating performance can be obtained along the whole upper and side surfaces of the fin, and a high cooling performance for the generator can be sufficiently obtained.

It is also preferred that the wind power generating device further comprises a windward-side clamper arranged on the windward side of the cylindrical frame, and a leeward-side clamper arranged on the leeward side of cylindrical frame to put the stator of the generator between the windward-side clamper and the leeward-side clamper, wherein an upper surface of the windward-side clamper and an outer peripheral surface of the cylindrical frame have the same height as that of an upper surface of the leeward-side clamper in the axial direction of the cylindrical frame.

Therefore, because the flow of the outside air passes along the fin without decreasing the flow speed, the whole upper and side surfaces of the fin function as a superior heat dissipating plane, and a high cooling performance for the generator can be sufficiently obtained.

It is also preferred that the wind power generating device further comprises a windward-side clamper arranged on the windward side of the cylindrical frame, and a leeward-side clamper arranged on the leeward side of cylindrical frame to put the stator of the generator between the windward-side clamper and the leeward-side clamper, wherein the height of an upper surface of the windward-side clamper and the height of an upper surface of the leeward-side clamper are higher than that of an outer peripheral surface of the cylindrical frame in the axial direction of the cylindrical frame, and the height of the fin is higher than the height of an upper surface of the windward-side clamper and the height of an upper surface of the leeward-side clamper in the axial direction of the cylindrical frame.

Therefore, because the outside air directly collides with surfaces of the fin placed at a position higher than that of the cylindrical frame, a high heat transfer coefficient can be obtained. Also, because the outside air directly colliding with the surfaces of the fin does not collide with the leeward-side clamper, the whole surface of the fin functions as a superior heat dissipating plane, and a high cooling performance for the generator can be sufficiently obtained.

It is also preferred that the heat dissipating function of the cylindrical frame is exerted by a plurality of projections (or pins) which is outwardly arranged on the cylindrical frame in a radial direction of the cylindrical frame.

Therefore, because the projections (or the pins) are outwardly arranged on the cylindrical frame, in addition to the effect of the increase of the heat dissipating area, a plurality of areas, at which a heat transfer coefficient is heightened according to a boundary layer renewing effect, can be obtained along the flow direction of the outside air. Also, because vortexes of an air flow are generated on the leeward side of the projections, a turbulence intensity of the outside air flowing along the projections following the front projection placed on the windward side is increased, the heat transfer coefficient for the projections placed on the leeward side is heightened, and a high cooling performance for the generator can be obtained.

It is also preferred that the heat dissipating function of the cylindrical frame is exerted by a plurality of fins arranged at short pitches on an upper region of the cylindrical frame, in which influence of solar radiation is received, or on a lower region of the cylindrical frame in which influence of the pole is received, and each fin is outwardly protruded from the cylindrical frame in a radial direction of the cylindrical frame and extends in an axial direction of the cylindrical frame.

Therefore, a high cooling performance for the generator can be obtained, a distribution of the temperature of the engine in the circle-circumferential direction of the wind power generating device (or the rotational direction of the blade) can be arbitrarily set.

It is also preferred that the heat dissipating function of the cylindrical frame is exerted by a plurality of fins which are arranged on the cylindrical frame at various heights, and each fin is outwardly protruded from the cylindrical frame in a radial direction of the cylindrical frame and extends in an axial direction of the cylindrical frame.

Therefore, a high cooling performance for the generator can be obtained, a distribution of the temperature of the engine in the circle-circumferential direction of the wind power generating device (or the rotational direction of the blade) can be arbitrarily set.

It is also preferred that the heat dissipating function of the cylindrical frame is exerted by an outer circumferential wall extending in a circle-circumferential direction of the cylindrical frame.

Therefore, a heat dissipating area can be increased. Also, an ascending air current grows, and the heat dissipation is promoted by natural convection. Therefore, a cooling performance for the generator can be improved.

The object is also achieved by the provision of a wind power generating device comprising a horizontal shaft arranged on a top portion of a pole vertically arranged so as to be directed to a windward side, a generator having both a rotor fixed on a leeward side of the horizontal shaft and a stator arranged on the outside of the rotor, a blade which is fixed to the horizontal shaft on the windward side of the horizontal shaft and is rotated by a wind power, a cylindrical frame separating the stator of the generator from outside air, and a cover, with which the cylindrical frame is covered, for leading the wind, which gives a rotational force to the rotor of the generator through the blade, to a space placed in the neighborhood of the cylindrical frame.

In the above configuration, heat generated in the generator is transferred to the cylindrical frame by conduction. Also, the wind of outside air, which has already given a rotational force to the rotor through the blade, passes through an area between the cylindrical frame and the cover, and the heat is dissipated from the cylindrical frame to the outside air.

Accordingly, a flow speed of the outside air is increased on an outer peripheral surface of the frame, and the cooling performance for the generator can be improved. Also, because the cover prevents the outer peripheral surface of the frame from directly receiving solar radiation, the increase of the temperature of the generator due to direct solar radiation can be suppressed, and a wind power generating device with superior cooling performance can be obtained.

It is preferred that a clearance between the cylindrical frame and the cover is gradually shortened in a windward range from a front portion of the cover on the windward side to a portion of the cover placed in the neighborhood of the cylindrical frame.

Therefore, the flow speed of the outside air can be increased in the neighborhood of the outer peripheral surface of the frame, and a sufficient cooling performance for the generator can be obtained.

It is also preferred that a clearance between the cylindrical frame and the cover is gradually lengthened in a leeward range from a portion of the cover placed in the neighborhood of the cylindrical frame to a rear portion of the cover on the leeward side.

In this case, because an open area at the outlet of the outside air can be increased, a flow speed of the outside air can be decreased at the outlet, a pressure loss at the outlet of the cover is reduced, and the flow speed of the outside air passing along the outer peripheral surface of the frame is increased. Therefore, a sufficient cooling performance for the generator can be obtained.

It is also preferred that the wind power generating device further comprises a windward-side clamper arranged on the windward side of the cylindrical frame, and a leeward-side clamper arranged on the leeward side of cylindrical frame to put the stator of the generator between the windward-side clamper and the leeward-side clamper, wherein an upper surface of the windward-side clamper and an outer peripheral surface of the cylindrical frame have the same height as that of an upper surface of the leeward-side clamper in the axial direction of the cylindrical frame.

Therefore, the outside air can smoothly pass through the area between the cover and the frame without decreasing the flow speed of the outside air.

It is also preferred that the wind power generating device further comprises a plurality of supporting bars (or fins), which are outwardly arranged on the cylindrical frame in a radial direction of the cylindrical frame and extend in an axial direction of the cylindrical frame, for supporting the cover by attaching the cover to a top portion of the supporting bars.

Therefore, the speed of the outside air flowing into a duct-shaped space, which is surrounded by the cover, the frame and the supporting bars (or the fins) adjacent to each other, can be increased. Also, because inner and outer peripheral surfaces of the cover, which is integrally formed with the supporting bars, can function as a heat dissipating plane, a sufficient cooling performance for the generator can be obtained.

It is also preferred that the wind power generating device further comprises a windward-side clamper arranged on the windward side of the cylindrical frame, and a leeward-side clamper arranged on the leeward side of cylindrical frame to put the stator of the generator between the windward-side clamper and the leeward-side clamper, wherein the height of an upper surface of the windward-side clamper and the height of an outer peripheral surface of the cylindrical frame are higher than that of an upper surface of the leeward-side clamper in the axial direction of the cylindrical frame.

Therefore, because the outside air flowing into the area between the cover and the frame is accelerated and collides with the leeward-side clamper, the heat dissipation from the cover, the frame and the leeward-side clamper can be promoted, and a sufficient cooling performance for the generator can be obtained.

It is also preferred that the wind power generating device further comprises a supporting bar (or a fin), which is outwardly arranged on the cylindrical frame in a radial direction of the cylindrical frame and extends in an axial direction of the cylindrical frame, for supporting the cover.

Therefore, the heat dissipation from the supporting bar (or the fin) can be promoted, and a sufficient cooling performance for the generator can be obtained.

It is also preferred that the cover is arranged on an upper region of the cylindrical frame, in which influence of solar radiation is received, or on a lower region of the cylindrical frame in which influence of the pole is received.

Therefore, the increase of the heat load in the upper region of the cylindrical frame can be suppressed, the heat dissipating performance in the lower region of the cylindrical frame can be improved, and a sufficient cooling performance for the generator can be obtained.

DETAILED DESCRIPTION OF THE PREFERRED EMBODIMENTS

Embodiments of the present invention will now be described with reference to the accompanying drawings.

Embodiment 1

Figure 1:
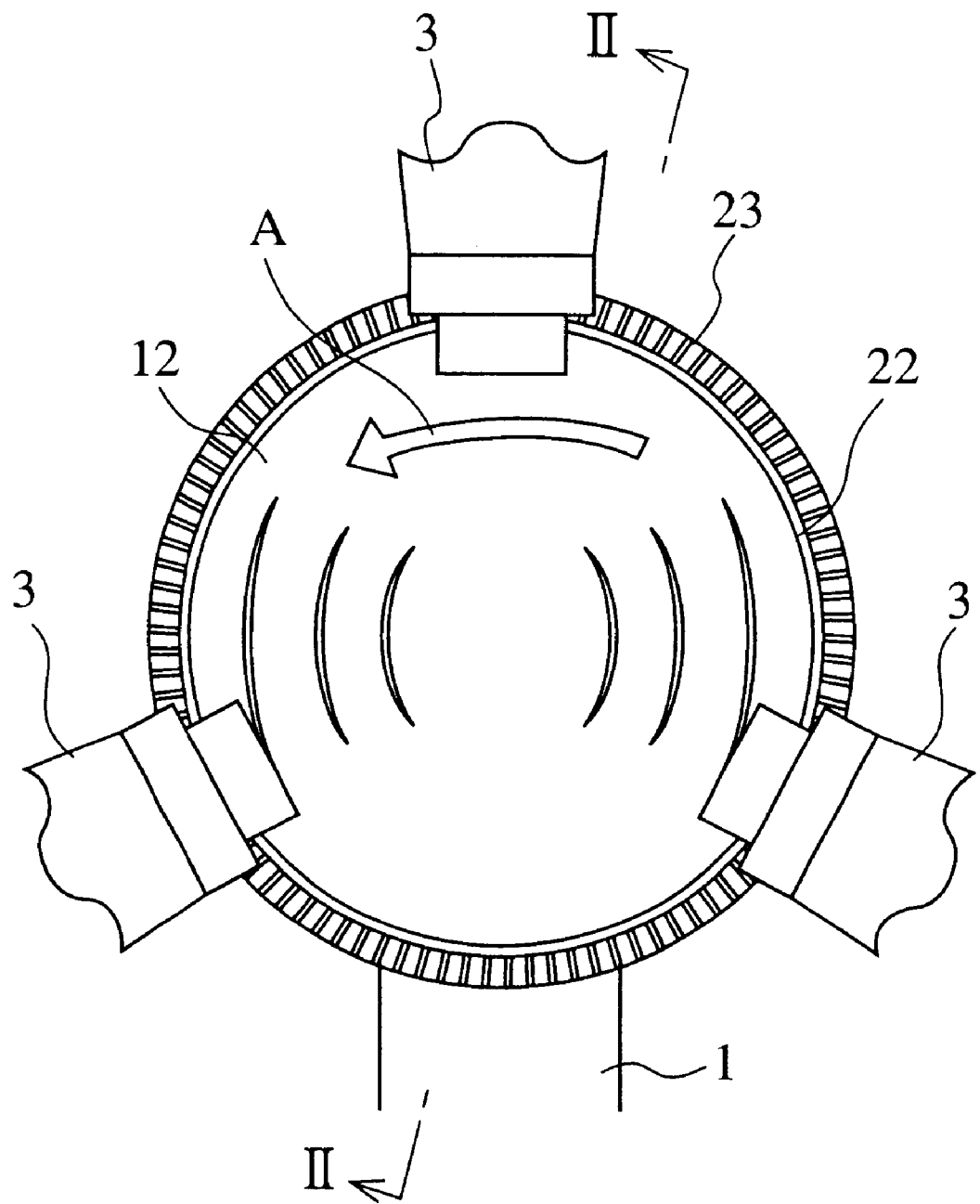
FIG. 1 is a front view of a wind power generating device according to a first embodiment of the present invention.
Figure 2:
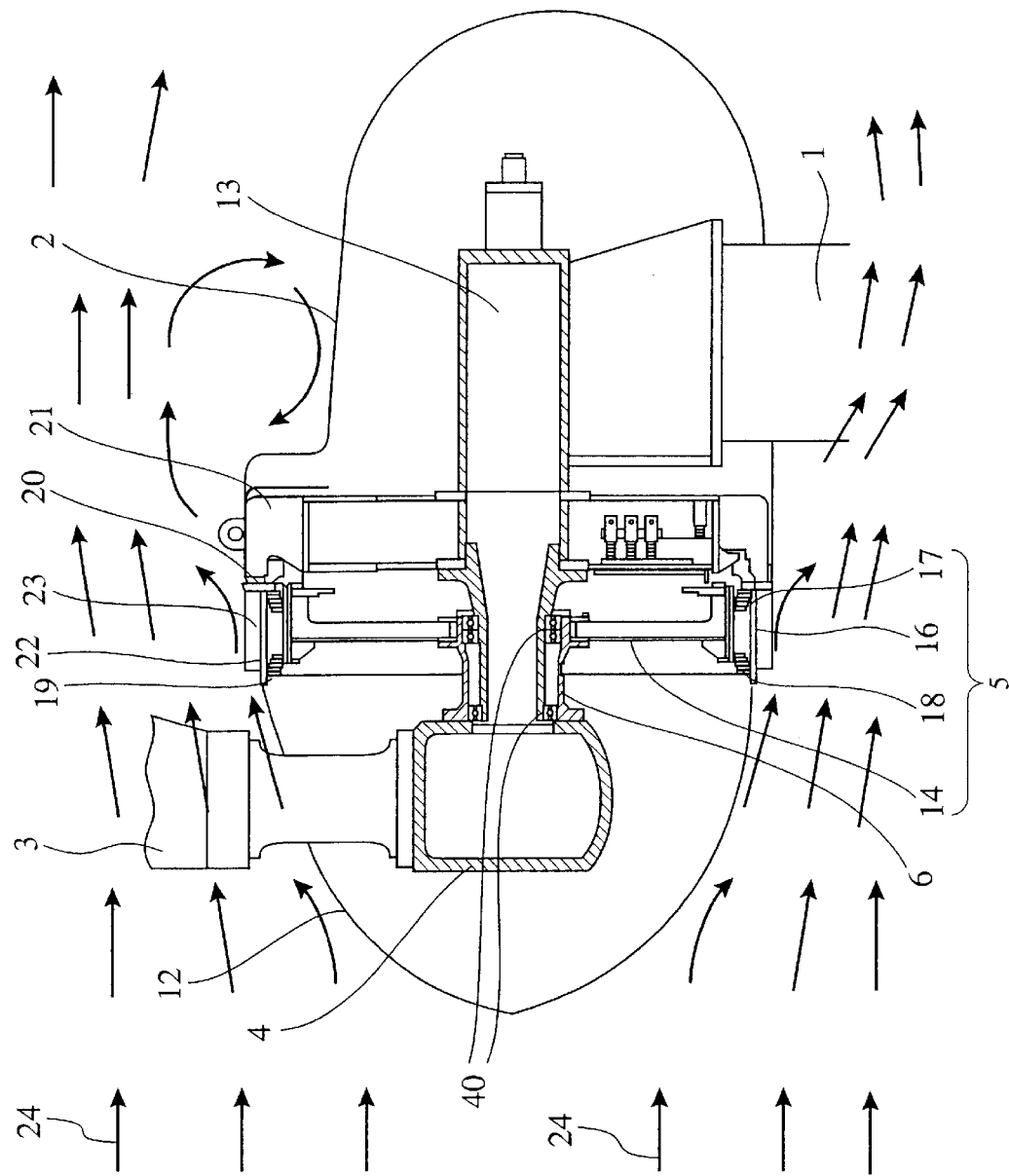
FIG. 2 is a section taken on line II—II line in FIG. 1.
Figure 3:
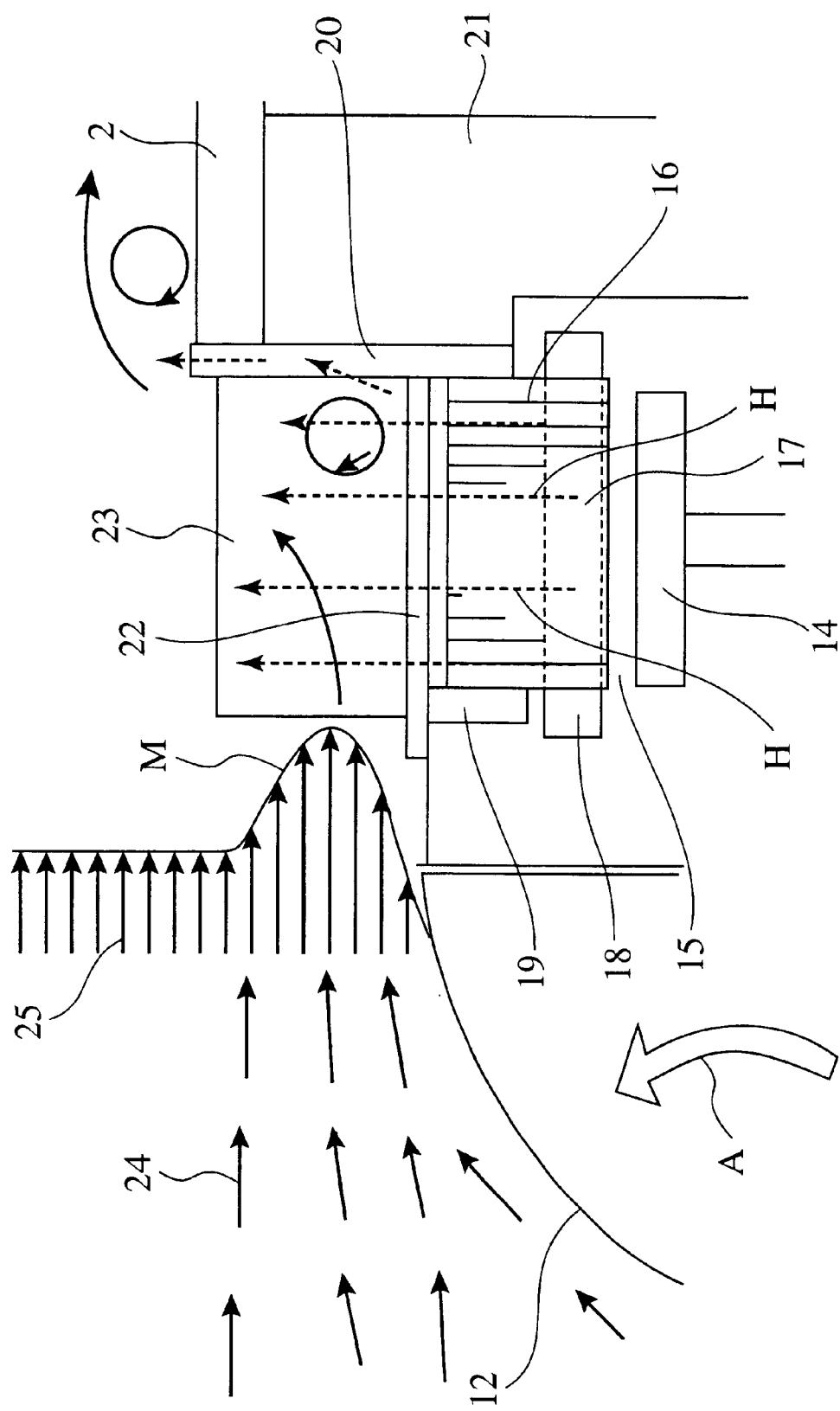
FIG. 3 is an enlarged sectional view of a heat dissipating unit of the wind power generating device shown in FIG. 1 and FIG. 2.
Figure 4:
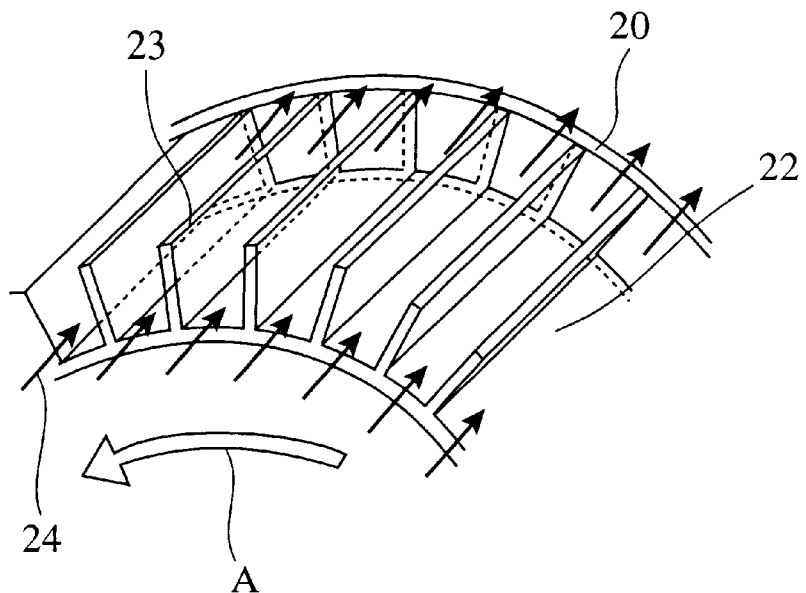
FIG. 4 is a diagonal view describing an operation of the heat dissipating unit of the wind power generating device shown in FIG. 1 and FIG. 2.
Figure 30:
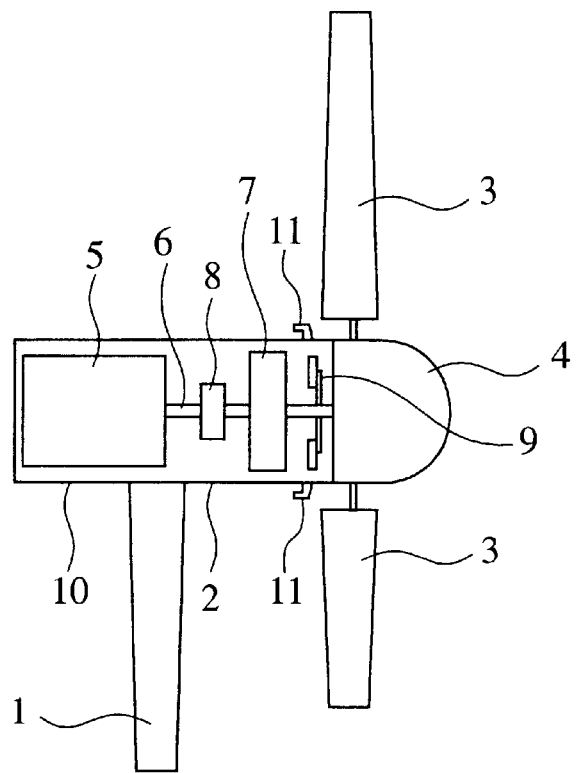
FIG. 30 is a sectional view showing a structure of a conventional wind power generating device.
Figure 31:
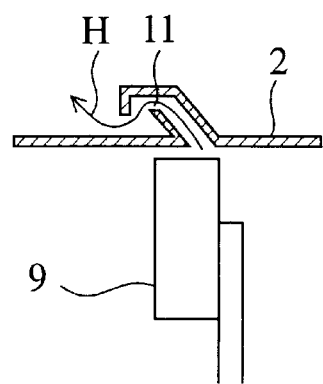
FIG. 31 is an enlarged sectional view showing principal components of a cooling structure of the conventional wind power generating device shown in FIG. 30.

FIG. 1 is a front view of a wind power generating device according to a first embodiment of the present invention, FIG. 2 is a section taken on line II—II line in FIG. 1, FIG. 3 is an enlarged sectional view of a plurality of heat dissipating units of the wind power generating device shown in FIG. 1 and FIG. 2, and FIG. 4 is a diagonal view, with portions broken away for clarity, describing an operation of the heat dissipating units of the wind power generating device shown in FIG. 1 and FIG. 2. Here, constitutional elements of the first embodiment, which are the same as those shown in FIG. 30 or FIG. 31, are indicated by the same reference numerals as those shown in FIG. 30 or FIG. 31, and additional description of these constitutional elements is omitted. Also, additional description of constitutional elements of embodiments following the first embodiment is omitted in cases where the constitutional elements have been already described.

A wind power generating device according to a first embodiment, which differs from that of the prior art, has no step-up gear. However, the present invention can be applied for a wind power generating device with a step-up gear.

In the first embodiment, as shown in FIG. 1, FIG. 2 and FIG. 3, the hub 4, to which the three blades 3 receiving wind are fixed so as to extend in a radial direction of the hub 3 at equal intervals, is arranged in a spindle-shaped boss 12. The spindle-shaped boss 12 has an air flow direction rectifying function. The hub 4 is fixed to the front portion (or a windward-side portion) of the horizontal shaft 6. A longitudinal direction of the horizontal shaft 6 is controlled by an anemoscope & anemometer (not shown) and a direction control mechanism (not shown) operated with each other to always arrange the hub 4 and the blades 3 on the windward side of the horizontal shaft 6. The horizontal shaft 6 is attached to a fixed shaft 13 through a bearing 40 and rotates freely on the fixed shaft 13. The fixed shaft 13 is fixed to a top portion of the pole 1. A rotor 14 of the generator 5 is fixed to the horizontal shaft 6. A stator 16 is arranged on the outside of the rotor 14 through a fixed clearance 15. The generator 5 comprises the rotor 14 and the stator 16. The stator 16 comprises a plurality of stator cores 17, which are formed of laminated silicon-steel plate, and a plurality of stator coils 18 wound on the stator cores 17. The stator 16 is arranged between a windward-side clamper 19 and a leeward-side clamper 20 and is fixed to the fixed shaft 13 through a stay 21.

The nacelle 2 functions as an outside wall for the top portion of the pole 1, the fixed shaft 13 and the stay 21, and an internal area of the nacelle 2 is closed to the outside air. The generator 5 is arranged on the windward side of the nacelle 2, and a cylindrical frame 22 is arranged on the outside of the stator core 17 of the generator 5 to separate the stator 16 from the outside air. In this first embodiment, an upper surface of the windward-side clamper 19 and an outer peripheral surface of the frame 22 are placed on the same plane, and an outer surface of the boss 12, which rotates with the blades 3, and the outer peripheral surface of the frame 22 form a continuous plane. On the outer peripheral surface of the frame 22, a plurality of fins (or heat dissipating units) 23, which are outwardly protruded in a radial direction of the frame 22 and extend in an axial direction of the frame 22, are arranged so as to be placed in a circle-circumferential direction of the frame 22 at equal intervals. As shown in FIG. 4, each fin 23 has a structure of a rectangular wall extending in the wind direction (indicated by arrows in FIG. 4), and an upper surface of the fin 23 is set to be lower than an upper surface of the leeward-side clamper 20.

Next, an operation of the wind power generating device will be described below.

As shown in FIG. 1 to FIG. 4, when the blades 3 are rotated in a prescribed direction A by receiving outside air 24 of a high wind power, the rotor 14 of the generator 5 is rotated in the inside of the stator 16 through the horizontal shaft 6, a kinetic energy of the rotor 14 is transformed into an electric energy, and the generation of electric power is started. In this case, heat generated with the electric power in the generator 5 is transferred to the frame 22 and the fins 23 through the stator-core 17 and is dissipated to the outside air 24.

Also, the outside air 24 of a high wind power, which has already rotate the blades 3, passes through an area between each pair of blades 3, flows along the outer surface of the boss 12, reaches in the neighborhood of the frame 22 and the fins 23 and collides with the fins 23 protruded from the outer peripheral surface of the frame 22. In this case, as shown in FIG. 3, in the neighborhood of the frame 22 and the fins 23, a boundary layer 25, which is moved in the axial direction of the frame 22, grows out of the flow of the outside air 24 due to viscosity of the outside air 24. Also, because the outside air 24 is pushed aside by the outer surface of the boss 12 and the outer peripheral surface of the frame 22, a maximum speed region M, in which the wind speed is higher than that in the main flow of the outside air 24, is formed in the boundary layer 25 at a position apart from the outer peripheral surface of the frame 22 by a prescribed distance. Also, because the boundary layer 25 grows along the outer surface of the boss 12, the boundary layer 25 becomes thicker on the outer peripheral surface of the frame 22. Therefore, when the outside air 24 forming the boundary layer 25 collides with the fins 3 protruded from the outer peripheral surface of the frame 22, the heat is efficiently dissipated to the outside air 24. Because the heat is efficiently dissipated to the outside air 24, a heat flow H, which is directed from the rotor 14 of the generator 5 to the fins 23 through the clearance 15, the stator 16 including the stator cores 17 and the frame 22, and another heat flow H, which is directed from the rotor 14 of the generator 5 to the leeward-side clamper 20 through the clearance 15, the stator 16, the frame 22 and the fins 23, are efficiently generated, and the heat is efficiently dissipated from the frame 22, the fins 23 and the outer surface of the leeward-side clamper 20 to the outside air 24.

As is described above, in the first embodiment, the wind power generating device does not have any of the air supplying opening 10, the exhaust vents 11 and the air blower 9 used in the prior art. A wind power generating device having a simple cooling structure can be manufactured. Also, the driving power obtained from the wind power is not consumed by the air blower 9, but the wind power not used for the rotation of the blades 3 is used for the cooling of the generator 5. Therefore, the energy generation efficiency can be improved in the wind power generating device.

Also, in the first embodiment, because no outside air is supplied in an internal space of the nacelle 2, there is no probability that the units placed in the nacelle 2 are corroded by the water and/or salt contained in the outside air. Therefore, the wind power generating device can be stably operated for a long time without performing corrosion treatment for the units arranged in the nacelle 2.

Also, in the first embodiment, because the fins 23 are arranged on the frame 22, a heat dissipating area, from which the heat is dissipated to the outside air 24, can be increased, and the cooling performance of the wind power generating device can be considerably improved as compared with a case where no fin is arranged on the frame 22. Therefore, an inside temperature of the wind power generating device can be reliably lowered to a value equal to or lower than a standard value.

Also, in the first embodiment, the outside air 24 passing through the area between each pair of fins 23 collides with the leeward-side clamper 20 of which the upper surface is higher than those of the fins 23. Therefore, heat can be efficiently dissipated from the outer surface of the leeward-side clamper 20 to the outside air 24.

Also, in the first embodiment, even though a wind power of the outside air 24 is so low as to hardly rotate the blades 3, when the outside air 24 of the low wind power comes in contact with the fins 23, the fins 23 are cooled, and the heat remaining in the generator 5 is dissipated to the outside air 24 through the frame 22 and the fins 23. Therefore, the generator 5 can be always cooled, the units of the generator 5 can be maintained to a low temperature, and the cooling structure of the frame 22 and the fins 23 can prevent the performance of the wind power generating device from being lowered due to the heat.

Embodiment 2

Figure 5:
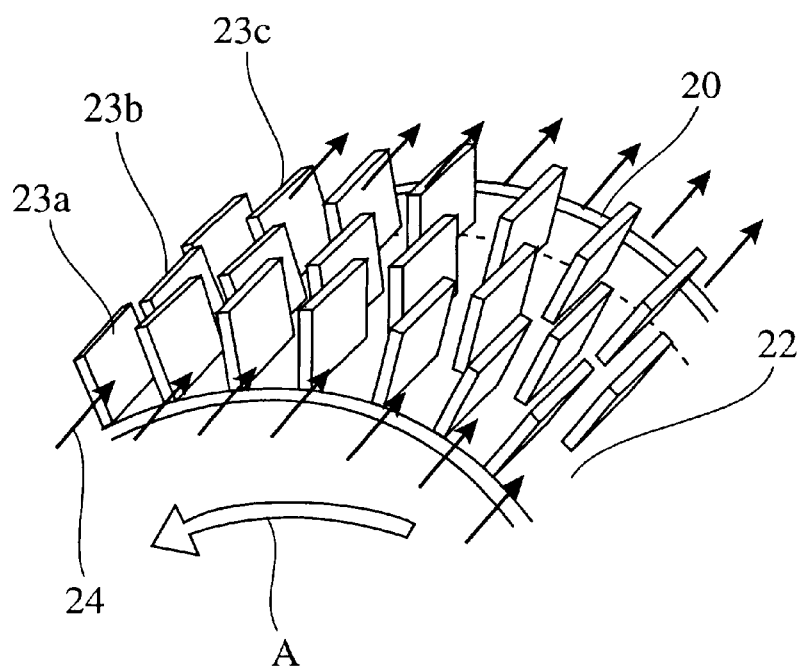
FIG. 5 is a diagonal view, with portions broken away for clarity, of a plurality of heat dissipating units of a wind power generating device according to a second embodiment of the present invention.

FIG. 5 is a diagonal view, with portions broken away for clarity, of a plurality of heat dissipating units of a wind power generating device according to a second embodiment of the present invention.

As shown in FIG. 5, in a wind power generating device according to a second embodiment, a plurality of divided fins (or heat dissipating units), each of which is outwardly protruded in the radial direction of the frame 22 and extends along the axial direction of the frame 22 (or a wind direction), are arranged on the outer peripheral surface of the frame 22 so as to be placed at equal intervals in the circle-circumferential direction of the frame 22, the divided fins are classified into a plurality of groups of divided fins (three groups of divided fins in this embodiment) serially placed in the axial direction of the frame 22, and each pair of divided fins adjacent to each other in the axial direction of the frame 22 are placed at positions different from each other along the circle-circumferential direction of the frame 22 to prevent the overlapping of the divided fins in the wind direction.

More precisely, in the second embodiment, the divided fins are classified into a group of divided fins 23a placed at the first row from the windward side, a group of divided fins 23b placed at the second row and a group of divided fins 23c placed at the third row. Each divided fin 23b is placed between the divided fins 23a most adjacent to the divided fin 23b in the circle-circumferential direction of the frame 22 so as to prevent the overlapping of the divided fins 23b with the divided fins 23a in the wind direction of the outside air 24. Also, each divided fin 23b is placed between the divided fins 23c most adjacent to the divided fin 23b in the circle-circumferential direction of the frame 22 so as to prevent the overlapping of the divided fins 23b with the divided fins 23c in the wind direction of the outside air 24. These features of the wind power generating device of the second embodiment differ from those of the first embodiment.

Next, an operation of the wind power generating device will be described below.

As shown in FIG. 5, outside air 24 having a high wind power collides with the divided fins 23a, 23b and 23c in the same manner as in the first embodiment. In this case, because the main flow of the outside air 24 directly collides with the front portion (or the windward-side portion) of each divided fin 23a placed at the first row from the windward side, the boundary layer 25 becomes thinner at the front portion and on both side surfaces of the divided fin 23a in the neighborhood of the front portion. Therefore, a heat transfer coefficient between the surface of the divided fin 23a and the outside air 24 is heightened. Thereafter, as the outside air 24 flows through the side surfaces of the divided fin 23a, the boundary layer 25 becomes thicker. Therefore, in case of the fin 23 of the first embodiment, because the fin 23 is lengthened in the axial direction of the frame 22, there is a probability that a heat transfer coefficient between the fin 23 and the outside air 24 is lowered. To prevent the lowering of the heat transfer coefficient, in the second embodiment, each set of fins 23a, 23b and 23c is arranged in place of the fin 23 in the axial direction of the frame 22, and the divided fin 23b is placed at a position different from that of the divided fin 23a in the circle-circumferential direction of the frame 22. In this case, the main flow of the outside air 24 directly collides with the front portion of the divided fin 23b placed at the second row. Therefore, the boundary layer 25 becomes thinner at the front portion and on both side surfaces of the divided fin 23b in the neighborhood of the front portion, and a heat transfer coefficient between the surface of the divided fin 23b and the outside air 24 is heightened in the same manner as in the divided fin 23a. As is described above, a phenomenon that a high heat transfer coefficient is obtained at a front portion of an object is called a boundary layer renewing effect. Thereafter, because the divided fin 23c is placed at a position different from that of the divided fin 23b in the circle-circumferential direction of the frame 22, the boundary layer renewing effect is obtained for the divided fin 23c, and a heat transfer coefficient between the surface of the divided fin 23c and the outside air 24 is heightened in the same manner as in the divided fins 23a and 23b.

As is described above, in the second embodiment, the groups of divided fins 23a, 23b and 23c are serially arranged along the axial direction of the frame 22 as if each fin 23 of the first embodiment is divided into three divided fins 23a, 23b and 23c along the axial direction of the frame 22, and each divided fin 23b placed between the divided fins 23a and 23c in the axial direction of the frame 22 is placed at a position different from those of the divided fins 23a and 23c in the circle-circumferential direction of the frame 22. Therefore, as compared with the wind power generating device of the first embodiment, a heat dissipating area of the divided fins 23a, 23b and 23c can be increased, and the heat transfer coefficient between the surface of each divided fin 23a, 23b or 23c and the outside air 24 can be heightened because of the boundary layer renewing effect. Accordingly, a high cooling performance for the generator 5 can be obtained in the wind power generating device.

Embodiment 3

Figure 6:
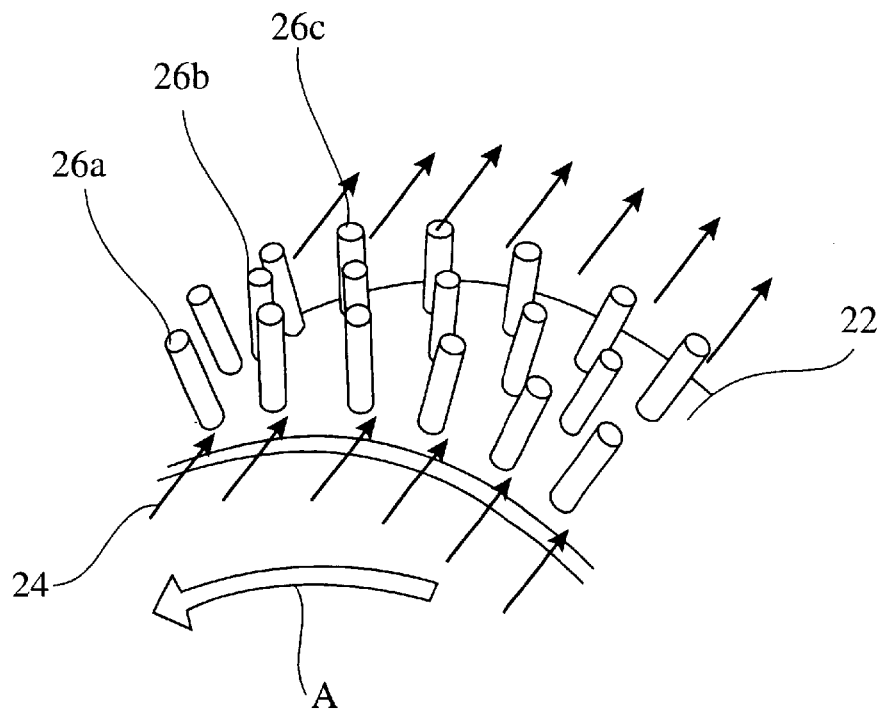
FIG. 6 is a diagonal view, with portions broken away for clarity, of a plurality of heat dissipating units of a wind power generating device according to a third embodiment of the present invention.

FIG. 6 is a diagonal view, with portions broken away for clarity, of a plurality of heat dissipating units of a wind power generating device according to a third embodiment of the present invention.

As shown in FIG. 6, in a wind power generating device according to a third embodiment, a plurality of pins are arranged in place of the divided fins 23a, 23b and 23c of the second embodiment. More precisely, a plurality of columnar pins (or heat dissipating units) 26a, 26b and 26c, each of which is outwardly protruded in the radial direction of the frame 22, are arranged on the outer peripheral surface of the frame 22 so as to place the group of pins 26a at the first row from the windward side, to place the group of pins 26b at the second row and to place the group of pins 26c at the third row. Each pair of pins 26a and 26b adjacent to each other in the axial direction of the frame 22 are placed at positions different from each other in the circle-circumferential direction of the frame 22 to prevent the overlapping of the pins 26b with the pins 26a in the wind direction of the outside air 24, and each pair of pins 26b and 26c adjacent to each other in the axial direction of the frame 22 are placed at positions different from each other in the circle-circumferential direction of the frame 22 to prevent the overlapping of the pins 26c with the pins 26b in the wind direction. These features of the wind power generating device of the third embodiment differ from those of the first and second embodiments.

Next, an operation of the wind power generating device will be described below.

As shown in FIG. 6, the outside air 24 of a high wind power collides with the pins 26a, 26b and 26c in the same manner as in the first embodiment. In this case, because the main flow of the outside air 24 directly collides with the top end of each pin 26a placed at the first row from the windward side, the boundary layer 25 becomes thinner at a front surface (or a windward-side surface) of the pin 26a and on an outer surface of the pin 26a in the neighborhood of the front surface. Therefore, a heat transfer coefficient between the surface of each pin 26a and the outside air 24 is heightened. Also, a heat transfer coefficient between the surface of each pin 26b or 26c and the outside air 24 is heightened.

As is described above, in the third embodiment, the pins 26a, 26b and 26c are arranged in series in the axial direction of the frame 22, and the pin 26b placed between the pins 26a and 26c in the axial direction of the frame 22 is placed at a position different from those of the pins 26a and 26c in the circle-circumferential direction of the frame 22. Therefore, as compared with the wind power generating device of the first embodiment, a heat dissipating area can be increased, and the heat transfer coefficient between the surface of each pin 26a, 26b or 26c and the outside air 24 can be heightened because of the boundary layer renewing effect. Accordingly, a high cooling performance for the generator 5 can be obtained in the wind power generating device.

Also, vortexes of the air flow are generated on the leeward side of the pins 26a, 26b and 26c. Therefore, intensity of turbulence in the outside air 24, which passes through the area between the pins 26b and the area between the pins 26c, is increased. Therefore, as compared with the wind power generating device of the second embodiment, the heat transfer coefficient between the surface of each pin 26b or 26c and the outside air 24 can be heightened. Accordingly, a high cooling performance for the generator 5 can be obtained in the wind power generating device.

In this embodiment, each pair of pins adjacent to each other in the axial direction of the frame 22 are placed at positions different from each other in the circle-circumferential direction of the frame 22 to prevent the overlapping of the divided fins in the wind direction. However, because vortexes of the air flow are generated on the leeward side of each pin, the high cooling performance can be obtained regardless of the positional relationship of the pins 26a, 26b and 26c in the circle-circumferential direction of the frame 22.

Embodiment 4

Figure 7:
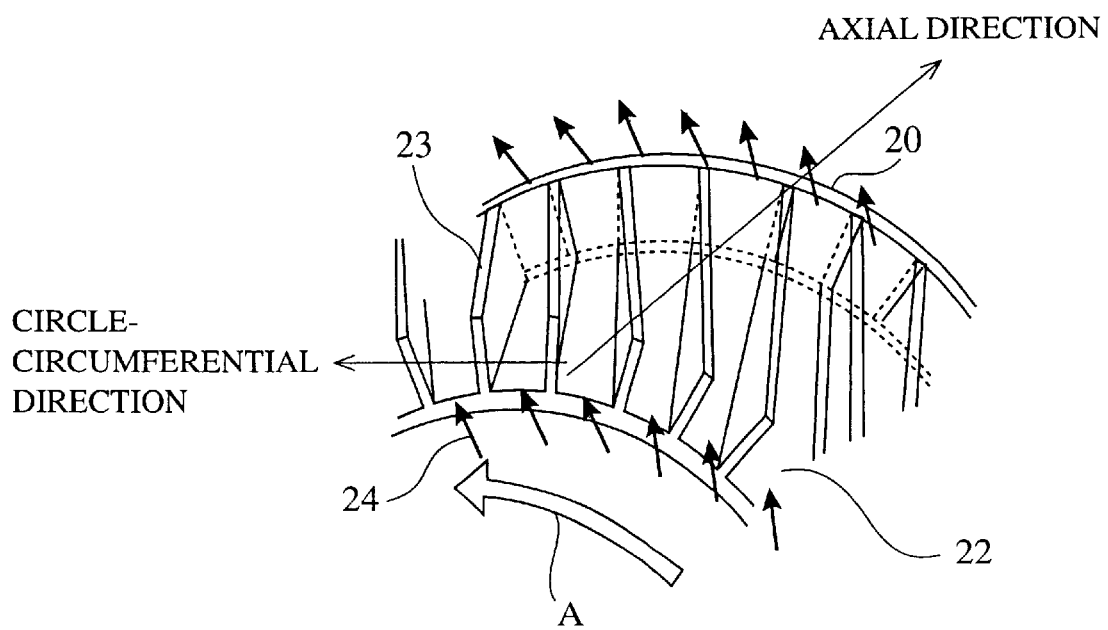
FIG. 7 is a diagonal view, with portions broken away for clarity, of a plurality of heat dissipating units of a wind power generating device according to a fourth embodiment of the present invention.
Figure 8:
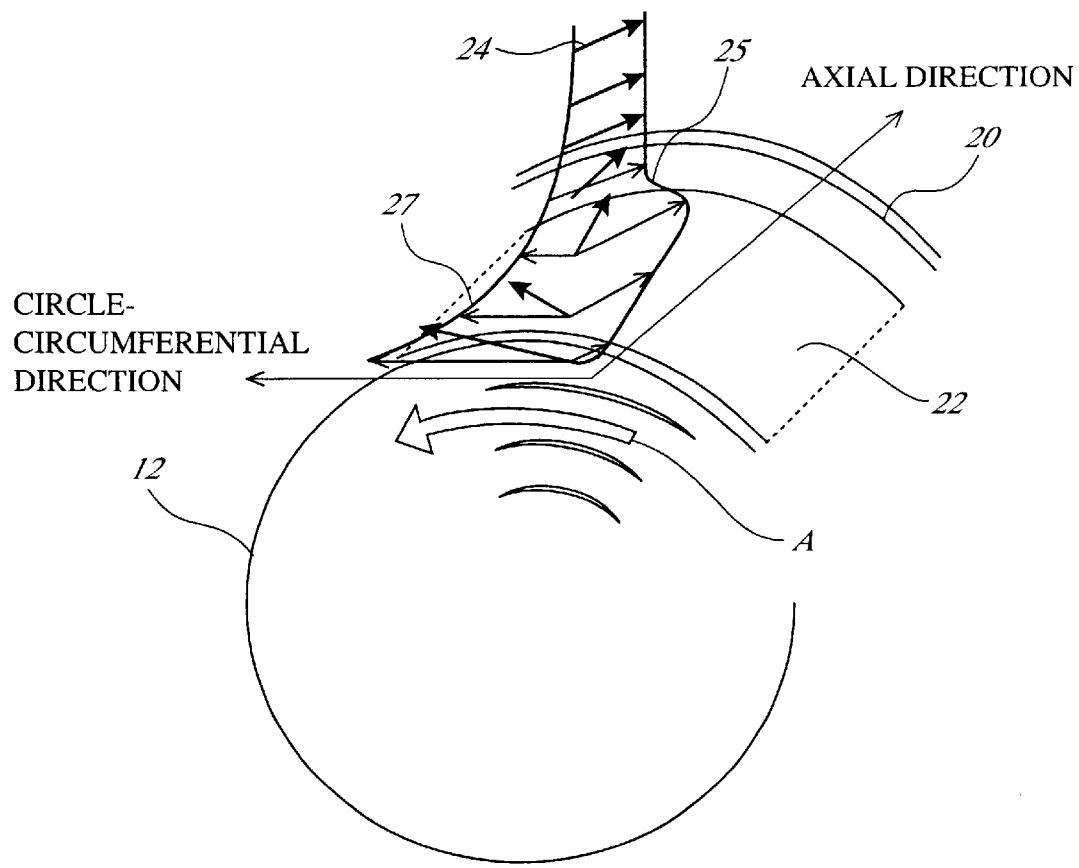
FIG. 8 is a diagonal view describing an operation of the heat dissipating units shown in FIG. 7.

FIG. 7 is a diagonal view, with portions broken away for clarity, of a plurality of heat dissipating units of a wind power generating device according to a fourth embodiment of the present invention, and FIG. 8 is a diagonal view describing an operation of the heat dissipating units shown in FIG. 7.

As shown in FIG. 7, in a wind power generating device according to a fourth embodiment, the fins (or the heat dissipating units) 23 are arranged on the outer peripheral surface of the frame 22 so as to incline the extending direction of the fins 23 toward the circle-circumferential direction of the frame 22 with respect to the axial direction of the frame 22. This feature of the wind power generating device of the fourth embodiment differs from those of the first embodiment.

Next, a flow of the outside air 24 on the outer surface of the wind power generating device will be described below.

As shown in FIG. 8, a boundary layer 27, which is moved in the circle-circumferential direction of the boss 12, grows out of the flow of the outside air 24 in the neighborhood of the boss 12 due to both the rotation of the outer surface of the boss 12 and the viscosity of the outside air 24. A motion speed of the boundary layer 27 on the outer surface of the boss 12 agrees with a rotational circumferential-speed of the boss 12 and rapidly decreases as the distance between the boundary layer 27 and the outer surface of the boss 12 increases. Also, the boundary layer 25 described in the first embodiment is moved at a motion speed in the axial direction of the frame 22, and the motion speed of the boundary layer 25 on the outer surface of the boss 12 is 0 m/s. A flow speed of the outside air 24 is obtained by combining the motion speed of the boundary layer 27 and the motion speed of the boundary layer 25. Therefore, the flow of the outside air 24 is inclined toward the circle-circumferential direction of the frame 22. Because the frame 22 functioning as a heat dissipating surface is arranged on the leeward side of the boss 12 and at a position near to the end surface of the boss 12, the flow of the outside air 24, which is supplied into the area between each pair of fins 23, is inclined toward the circle-circumferential direction of the frame 22 with respect to the axial direction of the frame 22.

Next, an operation of the wind power generating device will be described below.

As shown in FIG. 7, because the fins 23 are inclined toward the circle-circumferential direction of the frame 22 with respect to the axial direction of the frame 22, the outside air 24 directed in the extending direction of the fins 23 is supplied into an inlet of the area between each pair of fins 23 adjacent to each other. Therefore, a speed loss of the outside air 24 at the inlet of the area between each pair of fins 23 is reduced, and a flow rate of the outside air 24 is increased. Also, because the flow speed of the outside air 24 is increased by the motion speed of the boundary layer 27, the outside air 24 flows on the side surfaces of each fin 23 at a high speed.

As is described above, in the fourth embodiment, the fins 23 are arranged on the outer peripheral surface of the frame 22 so as to set an angle between the rotational direction A of the boss 12 (or the blades 3) and the extending direction of the fins 23 to an acute angle. Therefore, a heat dissipating area of the wind power generating device is increased, the flow rate of the outside air 24 is increased due to the reduction of the speed loss of the outside air 24 at the inlet of the fins 23, and the outside air 24, of which the flow speed is increased by the motion speed of the boundary layer 27, flows along the side surfaces of each fin 23. Accordingly, a heat transfer coefficient between the outer surface of each fin 23 and the outside air 24 can be heightened, and the cooling performance for the generator 5 can be considerably improved.

Embodiment 5

Figure 9:
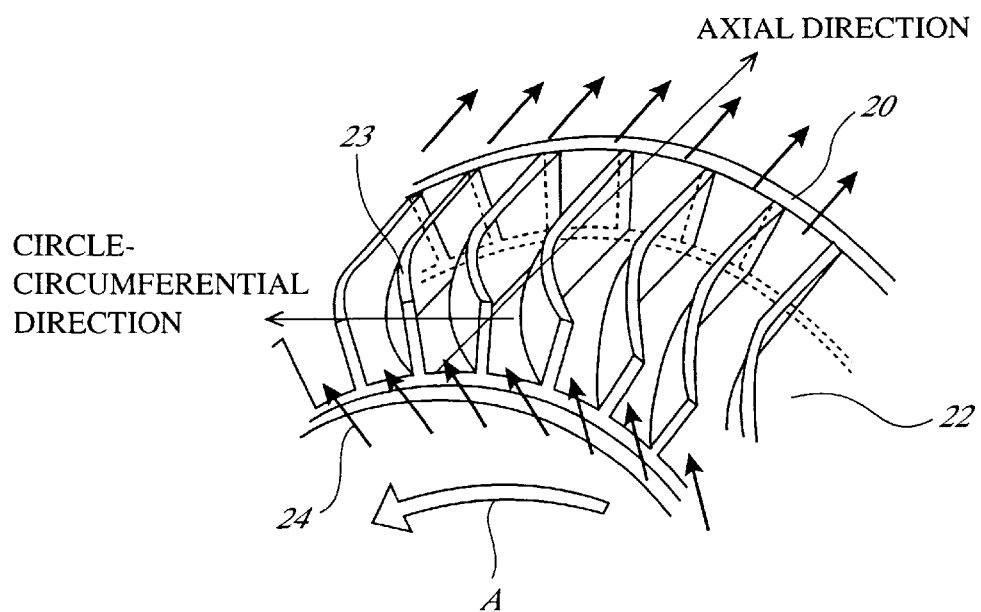
FIG. 9 is a diagonal view, with portions broken away for clarity, of a plurality of heat dissipating units of a wind power generating device according to a fifth embodiment of the present invention.

FIG. 9 is a diagonal view, with portions broken away for clarity, of a plurality of heat dissipating units of a wind power generating device according to a fifth embodiment of the present invention.

As shown in FIG. 9, in a wind power generating device of a fifth embodiment, the fins 23 are arranged on the outer peripheral surface of the frame 22 so as to incline front portions (or the windward-side portions) of the fins 23 toward the circle-circumferential direction of the frame 22 with respect to the axial direction of the frame 22, and the fins 23 are gradually curved toward the axial direction of the frame 22 along the leeward direction. This feature of the wind power generating device of the fifth embodiment differs from those of the first embodiment.

Next, an operation of the wind power generating device will be described below.

As shown in FIG. 9, the outside air 24 directed in the extending direction of the front portions (or the windward-side portions) of the fins 23 flows into an inlet of the area between each pair of fins 23. Therefore, a speed loss of the outside air 24 is reduced at the inlet of the fins 23. Also, because the fins 23 are gradually curved toward the axial direction of the frame 22 along the leeward direction, a centrifugal force is exerted on the outside air 24 which flows into the area between each pair of fins 23. Therefore, the outside air 24 flows along the side surfaces of the fins 23 according to the centrifugal force.

As is described above, in the fifth embodiment, the fins 23 are gradually curved toward the axial direction of the frame 22 along the leeward direction. Therefore, a heat dissipating area of the wind power generating device is increased, the flow rate of the outside air 24 is increased due to the reduction of the speed loss of the outside air 24 at the inlet of the fins 23, and the outside air 24, of which the flow speed is increased by the motion speed of the boundary layer 27, flows along the side surfaces of the fins 23. Accordingly, a heat transfer coefficient between the outer surface of each fin 23 and the outside air 24 can be heightened, and the cooling performance for the generator 5 can be considerably improved.

Embodiment 6

Figure 10:
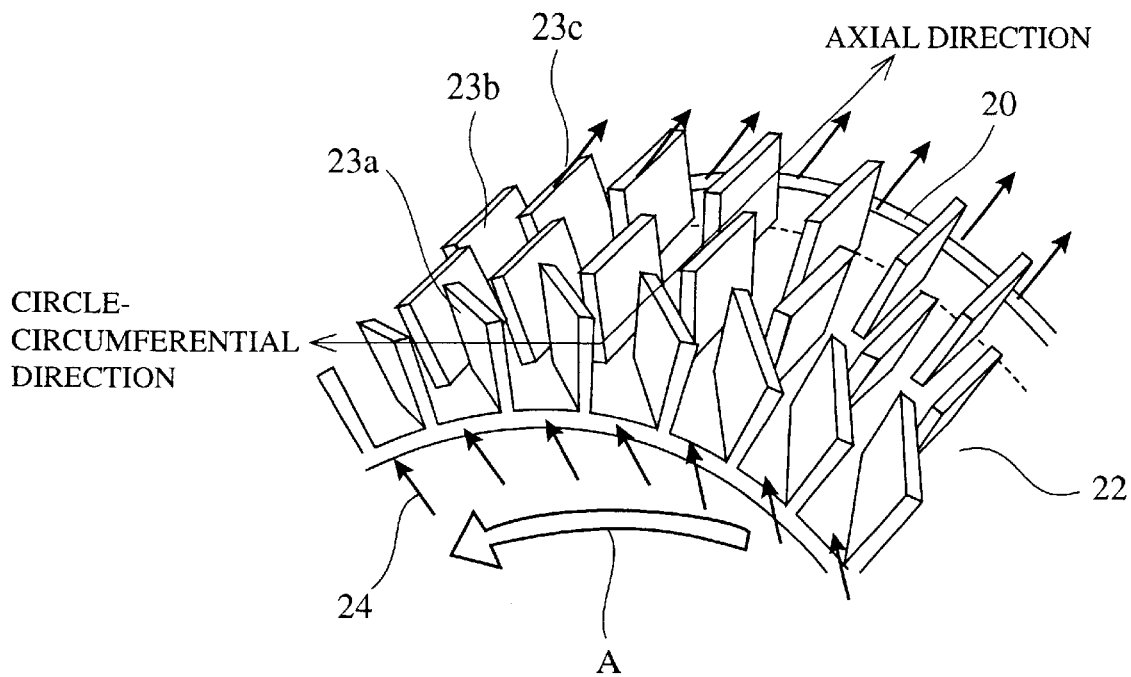
FIG. 10 is a diagonal view, with portions broken away for clarity, of a plurality of heat dissipating units of a wind power generating device according to a sixth embodiment of the present invention.
Figure 11:
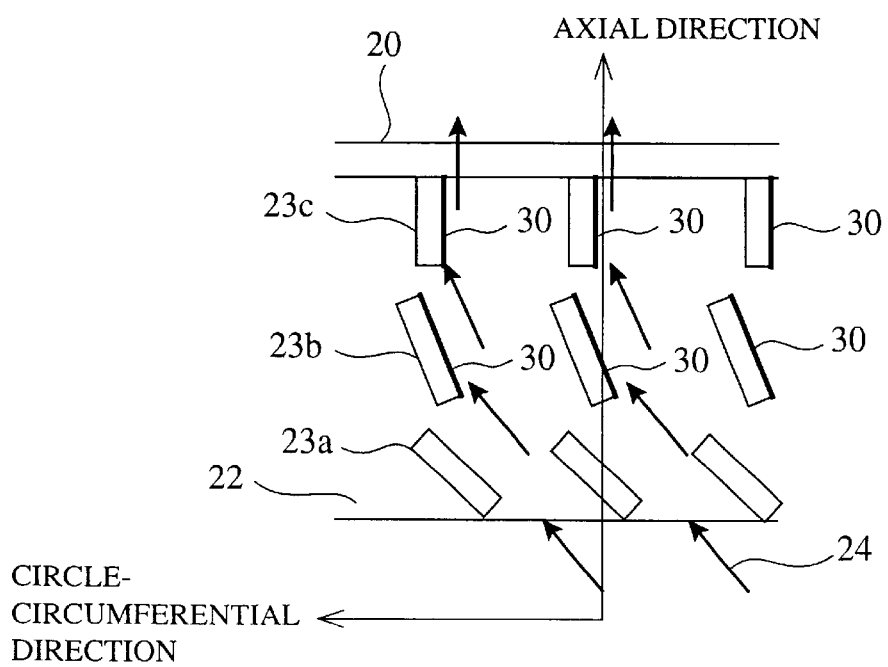
FIG. 11 is a plan view of the heat dissipating units shown in FIG. 10.

FIG. 10 is a diagonal view, with portions broken away for clarity, of a plurality of heat dissipating units of a wind power generating device according to a sixth embodiment of the present invention, and FIG. 11 is a plan view of the heat dissipating units shown in FIG. 10.

As shown in FIG. 10 and FIG. 11, in a wind power generating device of a sixth embodiment, the divided fins 23a are arranged on the outer peripheral surface of the frame 22 so as to incline the extending direction of the divided fins 23a by a first angle toward the circle-circumferential direction of the frame 22 (or the rotational direction A of the boss 12 or the blades 3) with respect to the axial direction of the frame 22, the divided fins 23b are arranged on the outer peripheral surface of the frame 22 so as to incline the extending direction of the divided fins 23b by a second angle lower than the first angle toward the circle-circumferential direction of the frame 22 with respect to the axial direction of the frame 22, and the extending direction of the divided fins 23c arranged on the outer peripheral surface of the frame 22 is parallel to the axial direction of the frame 22. In this case, it is applicable that the divided fins 23c be arranged on the outer peripheral surface of the frame 22 so as to incline the extending direction of the divided fins 23c by a third angle lower than the second angle toward the circle-circumferential direction of the frame 22 with respect to the axial direction of the frame 22. This feature of the wind power generating device of the sixth embodiment differs from that of the second embodiment.

Next, an operation of the wind power generating device will be described below.

As shown in FIG. 11, the outside air 24 flows into the area between each pair of divided fins 23a along the side surfaces of the divided fins 23a. Thereafter, because the extending direction of the divided fins 23b differs from that of the divided fins 23a, the outside air 24 collides with the front portion (or the windward-side portion) and one side surface 30 of each divided fin 23b placed on the windward side and flows along the side surface of the divided fin 23b. Thereafter, because the extending direction of the divided fins 23c differs from that of the divided fins 23b, the outside air 24 collides with the front portion (or the windward-side portion) and one side surface 30 of each divided fin 23c placed on the windward side and flows along the side surface of the divided fin 23c. In this case, the boundary layer 25 becomes thinner in the neighborhood of the side surface portions 30 of the divided fins 23b and 23c. Therefore, a high heat transfer coefficient between the side surface 30 of each divided fin 23b or 23c and the outside air 24 is obtained.

As is described above, in the sixth embodiment, the group of divided fins 23a, the group of divided fins 23b and the group of divided fins 23c are inclined, respectively, by prescribed angles different from each other toward the circle-circumferential direction of the frame 22 (or the rotational direction A of the boss 12 or the blades 3) with respect to the axial direction of the frame 22. Therefore, because the boundary layer 25 becomes thinner by the collision of the outside air 24 with the side surface portions 30 of the divided fins 23b and 23c, a high heat transfer coefficient between the side surface 30 of each divided fin 23b or 23c and the outside air 24 can be obtained in addition to the increase of the heat dissipating area. Accordingly, the cooling performance for the generator 5 can be considerably improved.

Embodiment 7

Figure 12:
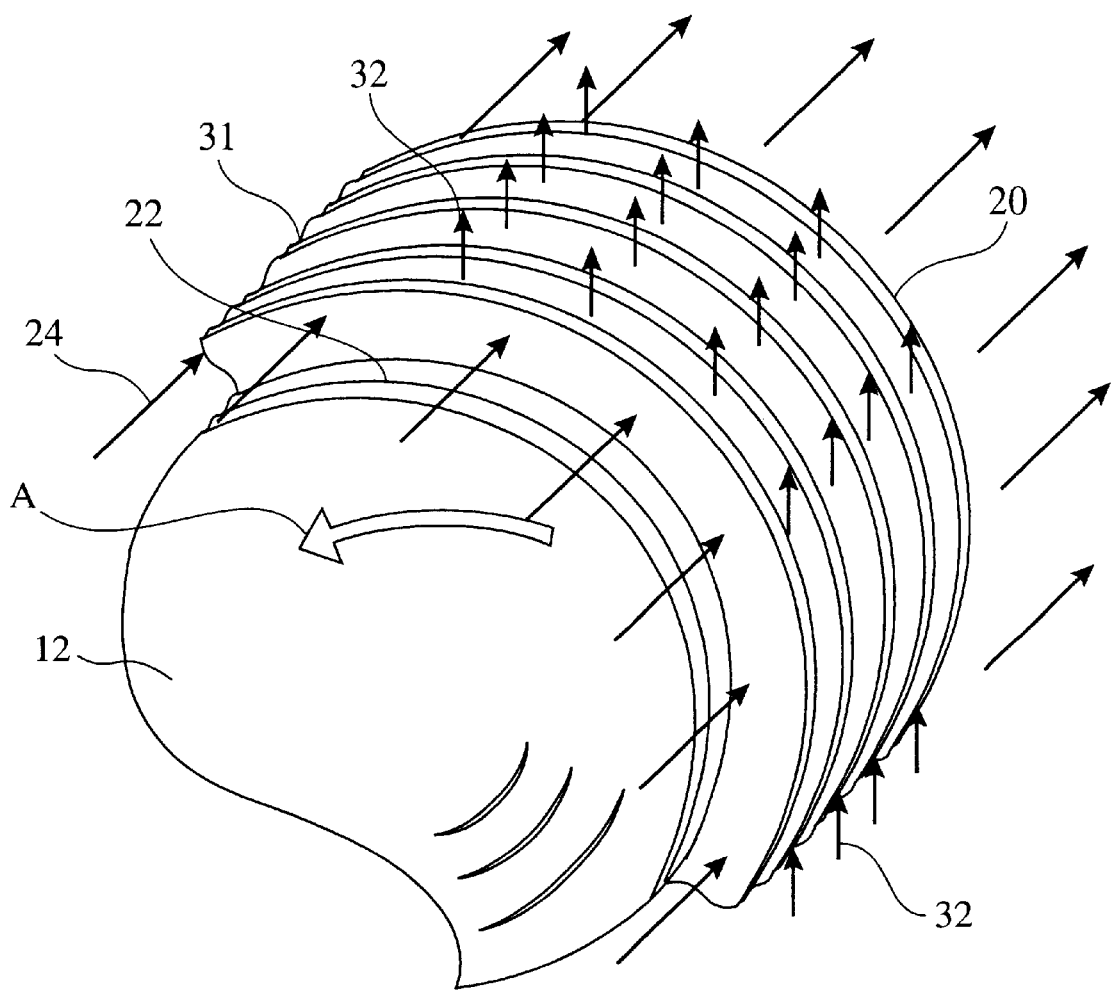
FIG. 12 is a diagonal view, with portions broken away for clarity, of a plurality of heat dissipating units of a wind power generating device according to a seventh embodiment of the present invention.
Figure 13:
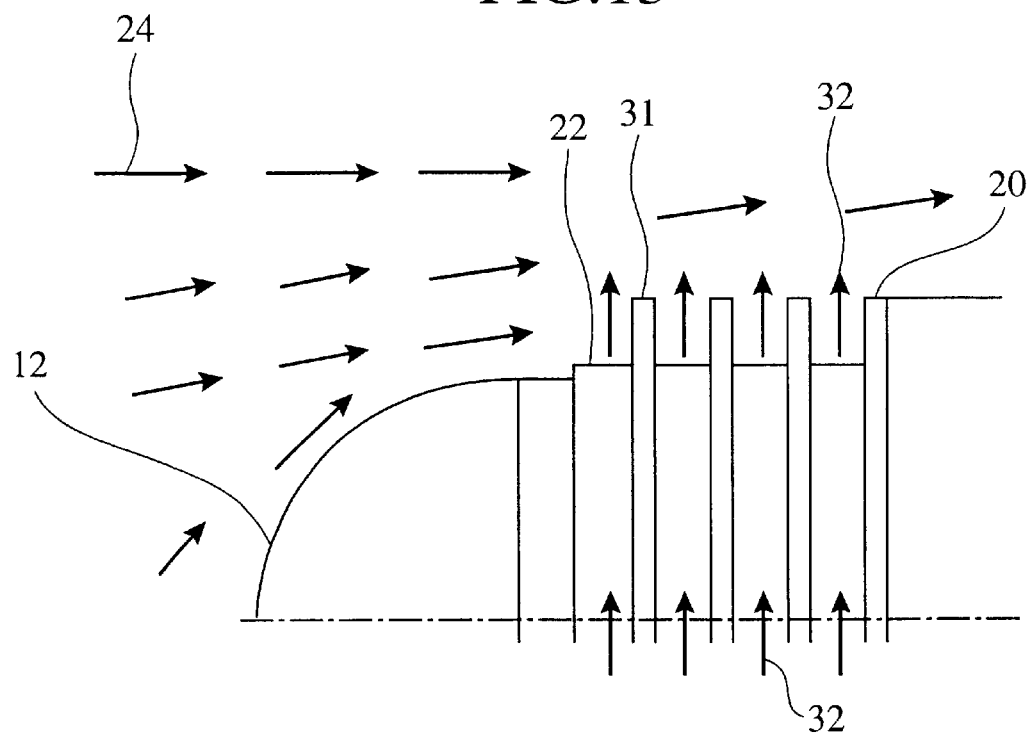
FIG. 13 is a side view of the heat dissipating units shown in FIG. 12 in case of an operation time of the wind power generating device.
Figure 14:
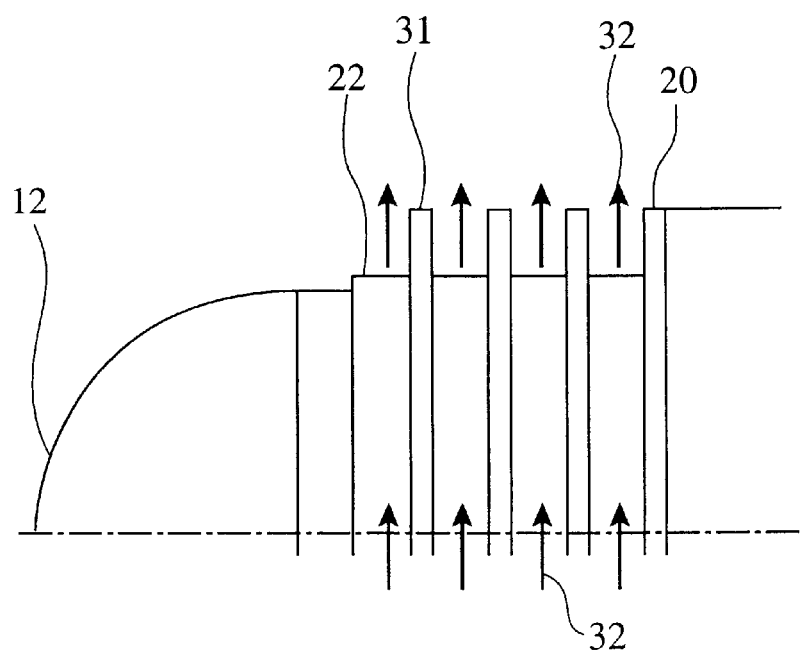
FIG. 14 is a side view of the heat dissipating units shown in FIG. 12 in case of an operation stop time of the wind power generating device.

FIG. 12 is a diagonal view, with portions broken away. for clarity, of a plurality of heat dissipating units of a wind power generating device according to a seventh embodiment of the present invention, FIG. 13 is a side view of the heat dissipating units shown in FIG. 12 in case of an operation time of the wind power generating device, and FIG. 14 is a side view of the heat dissipating units shown in FIG. 12 in case of an operation stop time of the wind power generating device.

As shown in FIG. 12, FIG. 13 and FIG. 14, in a wind power generating device of a seventh embodiment, a plurality of outer circumferential walls (or heat dissipating units) 31, each of which extends in the circle-circumferential direction of the frame 22, are serially arranged on the outer peripheral surface of the frame 22 along the axial direction of the frame 22. This feature of the wind power generating device of the seventh embodiment differs from that of the first embodiment.

Next, an operation of the wind power generating device will be described below.

As shown in FIG. 12 and FIG. 13, during the operation time of the generator 5, the temperature of the outer peripheral surface of the frame 22 is increased by the heat generated in the generator 5. When the frame 22 reaches a high temperature, the temperature of outside air placed in the neighborhood of the frame 22 is increased according to thermal conduction, and a temperature difference between the outside air placed in the neighborhood of the frame 22 and outside air still maintained to a low temperature is increased. Therefore, natural convection 32 of the outside air placed in the neighborhood of the frame 22 is generated, and an ascending air current grows along the outer circumferential walls 31 extending in the circle-circumferential direction of the frame 22.

Also, as shown in FIG. 12 and FIG. 14, even though the operation of the generator 5 is stopped, when the temperature of the frame 22 is increased, the natural convection 32 is generated, and the ascending air current grows along the outer circumferential walls 31.

As is described above, in the seventh embodiment, the outer circumferential walls 31 extending in the circle-circumferential direction of the frame 22 are arranged on the outer peripheral surface of the frame 22. Therefore, the heat dissipating area is increased, the heat dissipation due to the natural convection 32 is promoted, and the cooling performance for the generator 5 can be improved.

Also, in the seventh embodiment, even though the temperature of the frame 22 is increased due to solar radiation during the operation stop time of the generator 5, as shown in FIG. 14, the increases in the temperature of the frame 22 can be suppressed.

Embodiment 8

Figure 15:
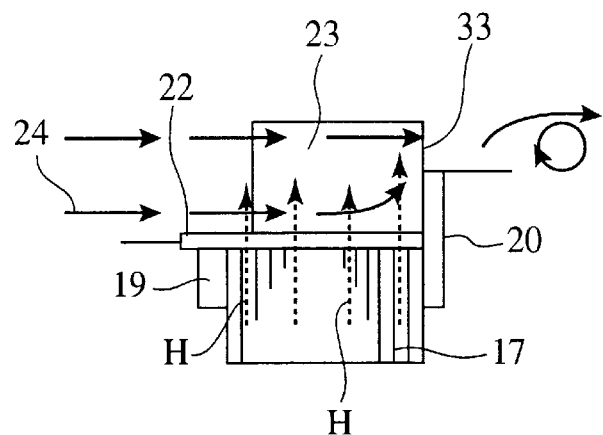
FIG. 15 is a sectional view, with portions broken away for clarity, of a plurality of heat dissipating units of a wind power generating device according to an eighth embodiment of the present invention.

FIG. 15 is a sectional view, with portions broken away for clarity, of a plurality of heat dissipating units of a wind power generating device according to an eighth embodiment of the present invention.

As shown in FIG. 15, in a wind power generating device of an eighth embodiment, upper portions of the fins 23, which are outwardly protruded in the radial direction of the frame 22, are set to be higher than the leeward-side clamper 20. This feature of the wind power generating device of the eighth embodiment differs from that of the first embodiment.

Next, an operation of the wind power generating device will be described below.

As shown in FIG. 15, because the outside air 24 passing through the area between the fins 23, which are arranged on the windward side of the leeward-side clamper 20, collides with the leeward-side clamper 20, the flow speed of the outside air 24 is rapidly decreased on the leeward side of the fins 23, and a heat dissipating performance of the wind power generating device is degraded at rear side surfaces of the fins 23 placed on the leeward side. However, because rear end portions 33 of the fins 23 are higher than the leeward-side clamper 20, the outside air 24, which passes along the upper side surfaces of the fins 23, does not collides with the leeward-side clamper 20. Therefore, the flow speed of the outside air 24 is not rapidly decreased on the upper side surfaces of the fins 23, and the outside air 24 passes along the fins 23.

As is described above, in the eighth embodiment, the upper portions of the fins 23 are set to be higher than the leeward-side clamper 20. Therefore, even though the upper side surfaces of the fins 23 are placed on the rear side of the fins 23, the heat dissipation from the upper side surfaces of the fins 23 can be improved. Accordingly, a superior heat dissipating performance of the fins 23 can be obtained in the whole upper side surfaces of the fins 23, and a sufficient cooling performance for the generator 5 can be obtained.

Figure 16:
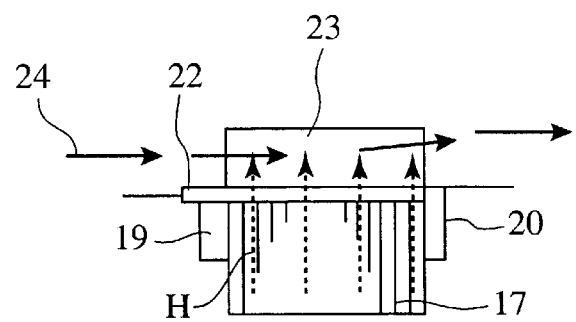
FIG. 16 is a sectional view, with portions broken away for clarity, of a plurality of heat dissipating units of a wind power generating device according to a modification of the eighth embodiment of the present invention.

FIG. 16 is a sectional view, with portions broken away for clarity, of a plurality of heat dissipating units of a wind power generating device according to a modification of the eighth embodiment of the present invention.

As shown in FIG. 16, in a wind power generating device of a modification of the eighth embodiment, the upper surface of the leeward-side clamper 20 is set to the same height as the outer-surface of the frame 22, and the fins 23 are arranged on the outer-surface of the frame 22.

In this modification, the outside air 24 passes along the fins 23 to leeward without rapidly decreasing the flow speed of the outside air 24. Therefore, a superior heat dissipating performance of the fins 23 can be obtained in the whole side surfaces of the fins 23, and a sufficient cooling performance for the generator 5 can be obtained.

Embodiment 9

Figure 17:
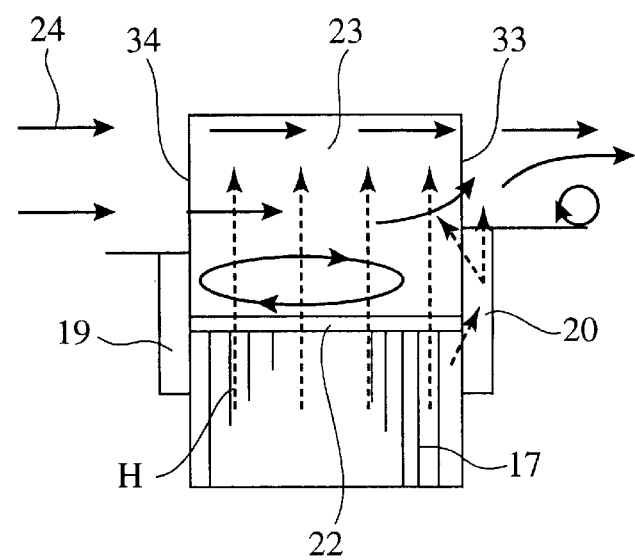
FIG. 17 is a sectional view, with portions broken away for clarity, of a plurality of heat dissipating units of a wind power generating device according to a ninth embodiment of the present invention.

FIG. 17 is a sectional view, with portions broken away for clarity, of a plurality of heat dissipating units of a wind power generating device according to a ninth embodiment of the present invention.

As shown in FIG. 17, in a wind power generating device of a ninth embodiment, the outer diameter of the windward-side clamper 19 and the outer diameter of the leeward-side clamper 20 are larger than that of the frame 22. That is, the upper surfaces of both the windward-side clamper 19 and the leeward-side clamper 20 are outwardly protruded toward the radial direction of the frame 22 so as to be placed at positions higher than that of the outer surface of the frame 22. Also, the fins 23 are outwardly protruded toward the radial direction of the frame 22 so as to be placed at positions higher than those of the windward-side clamper 19 and the leeward-side clamper 20. These feature of the wind power generating device of the ninth embodiment differ from those of the first embodiment.

Next, an operation of the wind power generating device will be described below.

As shown in FIG. 17, parts of the outside air 24 are separated from the flow of the outside air 24 in a leeward-side area of the windward-side clamper 19, and vortexes of the air flow are generated on the outer peripheral surface of the frame 22. Therefore, in general, the heat dissipation from the outer peripheral surface of the frame 22 is considerably lowered. However, because the fins 23 are arranged on the outer peripheral surface of the frame 22, the outside air 24 directly collides with front end portions 34 (or windward-side portions) of the fins 23 which are placed at positions higher than that of the windward-side clamper 19 and are protruded in the radial direction of the frame 22, and the flow of the outside air 24 passes along rear end portions 33 (or leeward-side portions) of the fins 23, which are placed at positions higher than that of the leeward-side clamper 20 and are protruded in the radial direction of the frame 22, to leeward without rapidly decreasing the flow speed of the outside air 24.

As is described above, in the ninth embodiment, because the outside air 24 directly collides with the front end portions 34 of the fins 23, a high heat transfer coefficient between the front end portion 34 of each fin 23 and the outside air 24 can be obtained. Also, because the leeward-side clamper 20 does not exist on the leeward side of the rear end portions 33 of the fins 23, a superior heat dissipating performance of the fins 23 can be obtained in the whole upper side surfaces of the fins 23 corresponding to the height of the rear end portions 33, and a sufficient cooling performance for the generator 5 can be obtained.

Embodiment 10

Figure 18:
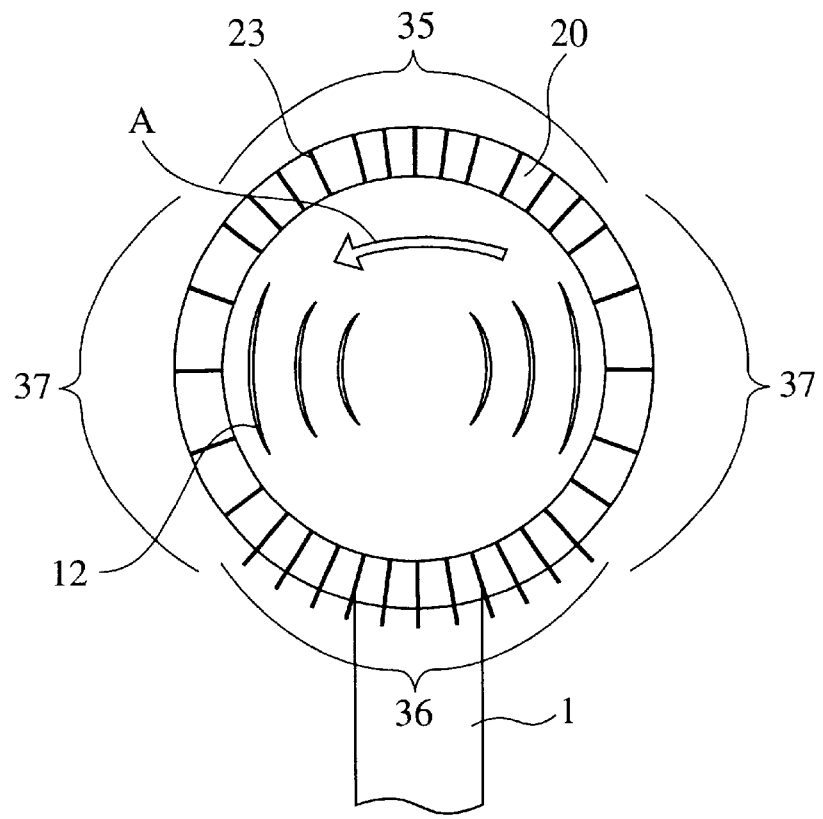
FIG. 18 is a front view, with portions broken away for clarity, of a plurality of heat dissipating units of a wind power generating device according to a tenth embodiment of the present invention.

FIG. 18 is a front view, with portions broken away for clarity, of a plurality of heat dissipating units of a wind power generating device according to a tenth embodiment of the present invention.

In the wind power generating devices of the first to ninth embodiments, the fins 23 (or the divided fins 23a, 23b and 23c or the pins 26a, 26b and 26c) are arranged on the whole outer peripheral surface of the frame 22 at equal intervals. However, in a wind power generating device of a tenth embodiment, as shown in FIG. 18, the fins 23 are arranged on the whole outer peripheral surface of the frame 22 at various intervals (or unequal pitches), and the fins 23 having various shapes and sizes are used in dependence on the positions of the fins 23 on the outer peripheral surface of the frame 22. More precisely, because the frame 22 directly receives the solar radiation in an upper region 35 which is placed on the upper side of the outer peripheral surface of the frame 22, heat load is high in the upper region 35. Therefore, the fins 23 are arranged at short pitches in the upper region 35 to increase the heat dissipating area in the upper region 35. Also, because the flow speed of the outside air 24 in the neighborhood of the frame 22 is lowered by the pole 1 in a lower region 36 which is placed on the lower side of the outer peripheral surface of the frame 22, the fins 23, of which the height is higher than that of the fins 23 arranged in the upper region 35, are arranged in the lower region 36 at short pitches to increase the heat dissipating area to a high degree in the lower region 36. Also, in both side regions 37 which are placed on both sides of the outer peripheral surface of the frame 22, the intensity of the solar radiation is weak, and the flow speed of the outside air 24 is not lowered by the pole 1. Therefore, the fins 23, of which the height is the same as that of the fins 23 arranged in the upper region 35, are arranged at long pitches in the side regions 37.

Next, an operation of the wind power generating device will be described below.

As shown in FIG. 18, in the upper region 35 of the outer peripheral surface of the frame 22, outside air 24 having a high wind power collides with the front portions (or the windward-side portions) of the fins 23 arranged at short pitches. Because the intervals of the fins 23 are shorter than those in the side regions 37, the heat dissipating efficient in the upper region 35 is higher than that in the side regions 37. Therefore, the heat received by the solar radiation is efficiently dissipated in the upper region 35. Also, in the lower region 36 of the outer peripheral surface of the frame 22, the outside air 24, of which the flow speed is lower than that in the side regions 37 and the upper region 35, collides with the front portions (or the windward-side portions) of the fins 23 which have the high side surfaces and are arranged at short pitches. Therefore, the heat dissipating efficient in the lower region 36 is improved, and the heat of the frame 22 is efficiently dissipated in the lower region 36 even though the flow speed of the outside air 24 is low.

As is described above, in the tenth embodiment, the fins 23 are appropriately arranged on the upper region 35 of the outer peripheral surface of the frame 22 in which the heat load is high, and the fins 23 are appropriately arranged on the lower region 36 of the outer peripheral surface of the frame 22 in which the flow speed of the outside air 24 is low. Accordingly, a sufficient cooling performance for the generator 5 can be obtained.

Also, in the tenth embodiment, the fins 23 having various shapes and sizes can be arbitrarily arranged on the upper region 35 of the outer peripheral surface of the frame 22 according to a designer's intention. Accordingly, a temperature distribution of the generator 5 can be arbitrarily set according to the designer's intention.

Embodiment 11

Figure 19:
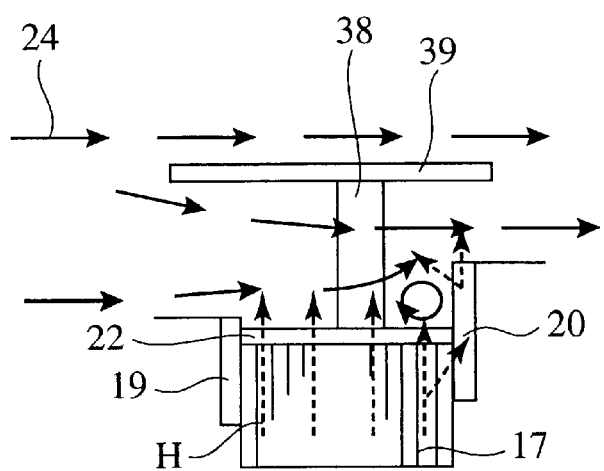
FIG. 19 is a sectional view, with portions broken away for clarity, of a plurality of heat dissipating units of a wind power generating device according to an eleventh embodiment of the present invention.
Figure 20:
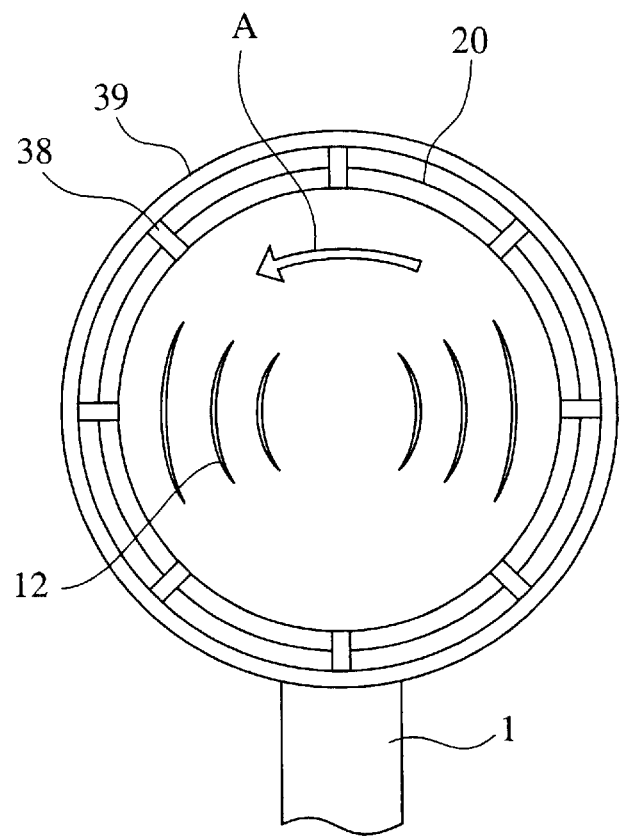
FIG. 20 is a front view of the wind power generating device shown in FIG. 19.

FIG. 19 is a sectional view, with portions broken away for clarity, of a plurality of heat dissipating units of a wind power generating device according to an eleventh embodiment of the present invention, and FIG. 20 is a front view of the wind power generating device shown in FIG. 19.

In the wind power generating devices of the first to tenth embodiments, the fins 23 (or the divided fins 23a, 23b and 23c or the pins 26a, 26b and 26c) are arranged on the whole outer peripheral surface of the frame 22. However, in a wind power generating device of an eleventh embodiment, no fin (or pin) is arranged on the whole outer peripheral surface of the frame 22. More precisely, as shown in FIG. 19 and FIG. 20, a plurality of supporting bars 38 are arranged on the outer peripheral surface of the frame 22 to be placed at equal intervals in the circle-circumferential direction of the frame 22, and a cylindrical cover 39 is arranged on the supporting bars 38 so as to cover the outer peripheral surface of the frame 22. The top surface of the windward-side clamper 19 is slightly higher than the outer peripheral surface of the frame 22, and the top surface of the leeward-side clamper 20 is considerably higher than the outer peripheral surface of the frame 22. The supporting bars 38 are higher than the top surface of the leeward-side clamper 20 to arrange a wide space between the cover 39 supported by the supporting bars 38 and the top surface of the leeward-side clamper 20. The diameter of the cover 39 on the windward side is the same as that on the leeward side, and the cover 39 is formed of material reflecting the solar radiation.

Next, an operation of the wind power generating device will be described below.

As shown in FIG. 19 and FIG. 20, when the outside air 25 collides with a front portion (or a windward-side portion) of the cover 39, a part of the outside air 25 flows into the space between the cover 39 and the frame 22. Therefore, the flow speed of the outside air 25 passing along the outer peripheral surface of the frame 22 is increased. Thereafter, the outside air 25, which flows into the space placed under the cover 39 and is accelerated, collides with front portions (or a windward-side portion) of the supporting bars 38 and the leeward-side clamper 20. Therefore, the heat dissipation from the outer peripheral surface of the frame 22 to the outside air 24 is promoted. Also, because the outside air 24 flows through the space between the cover 39 and the upper surface of the leeward-side clamper 20, the outside air 24 passes through the space placed under the cover 39 without lowering the flow speed of the outside air 24.

As is described above, in the eleventh embodiment, because the flow speed of the outside air 25 passing along the outer peripheral surface of the frame 22 is increased, the heat transfer coefficient is increased. Accordingly, a sufficient cooling performance for the generator 5 can be obtained.

Also, in the eleventh embodiment, because the cover 39 is formed of material reflecting the solar radiation, the cover 39 prevents the outer peripheral surface of the frame 22 from directly receiving the solar radiation. Accordingly, the increase of the heat load due to the direct solar radiation can be suppressed in the wind power generating device.

Also, because no fin (or no pin) is arranged on the outer peripheral surface of the frame 22, the structure of the wind power generating device can be simplified.

Figure 21:
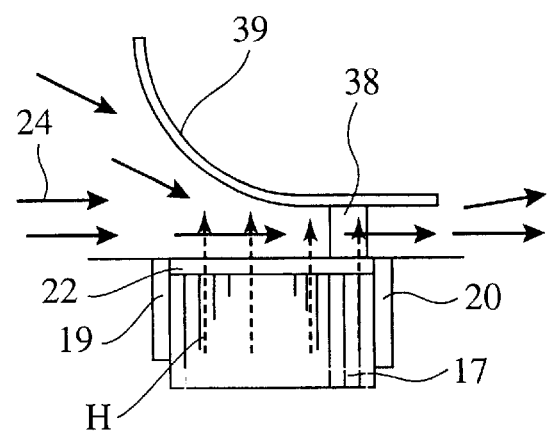
FIG. 21 is a sectional view, with portions broken away for clarity, of a plurality of heat dissipating units of a wind power generating device according to a first modification of the eleventh embodiment of the present invention.

FIG. 21 is a sectional view, with portions broken away for clarity, of a plurality of heat dissipating units of a wind power generating device according to a first modification of the eleventh embodiment of the present invention.

In this modification, as shown in FIG. 21, the diameter of the cover 39 on the windward side is larger than that shown in FIG. 19, and the diameter of the cover 39 gradually decreases along the wind direction from the windward side to the supporting bars 38. Also, the top surface of the windward-side clamper 19, the top surface of the leeward-side clamper 20 and the outer peripheral surface of the frame 22 have the same height.

Therefore, the outside air 24 existing in a wide area flows into the space between the cover 39 and the outer peripheral surface of the frame 22, and the flow speed of the outside air 24 is increased in the neighborhood of the outer peripheral surface of the frame 22. Accordingly, a sufficient cooling performance for the generator 5 can be obtained.

Also, in this modification, because the top surface of the windward-side clamper 19, the top surface of the leeward-side clamper 20 and the outer peripheral surface of the frame 22 have the same height, the flow speed of the outside air 24, which flows into the space placed under the cover 39, is not lowered, and the outside air 24 can smoothly pass through the space along the outer peripheral surface of the frame 22.

Figure 22:
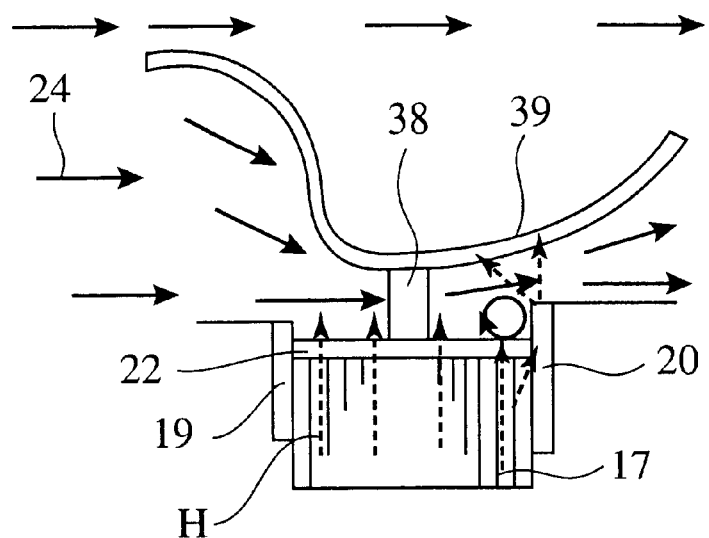
FIG. 22 is a sectional view, with portions broken away for clarity, of a plurality of heat dissipating units of a wind power generating device according to a second modification of the eleventh embodiment of the present invention.

FIG. 22 is a sectional view, with portions broken away for clarity, of a plurality of heat dissipating units of a wind power generating device according to a second modification of the eleventh embodiment of the present invention.

In this modification, as shown in FIG. 22, the diameter of the cover 39 is gradually decreased along the wind direction from the windward side to the supporting bars 38, the diameter of the cover 39 is gradually increased along the wind direction from the supporting bars 38 to the leeward side, and the diameter of the cover 39 is minimized on the supporting bars 38. The diameter of the cover 39 on the windward side is larger than that on the leeward side.

Therefore, the flow of the outside air 24, which is accelerated on the outer peripheral surface of the frame 22, is gradually decelerated and goes out from the outlet of the cover 39. In this case, because an open area of the space at the outlet of the cover 39 is large, the flow speed of the outside air 24 is decreased at the outlet of the cover 39. Therefore, the pressure loss of the outside air 24 at the outlet of the cover 39 is reduced so as to increase the flow speed of the outside air 24 which flows into the space between the cover 39 and the outer peripheral surface of the frame 22. Accordingly, a sufficient cooling performance for the generator 5 can be obtained.

Also, the top surface of the windward-side clamper 19 is slightly higher than the outer peripheral surface of the frame 22, and the top surface of the leeward-side clamper 20 is considerably higher than the outer peripheral surface of the frame 22. Therefore, the outside air 24, which flows into the space placed under the cover 39 and is accelerated, collides with the front portions (or the windward-side portions) of the supporting bars 38 and the leeward-side clamper 20. Accordingly, the heat dissipation from the outer peripheral surface of the frame 22, the supporting bars 38 and the leeward-side clamper 20 can be promoted.

Figure 23:
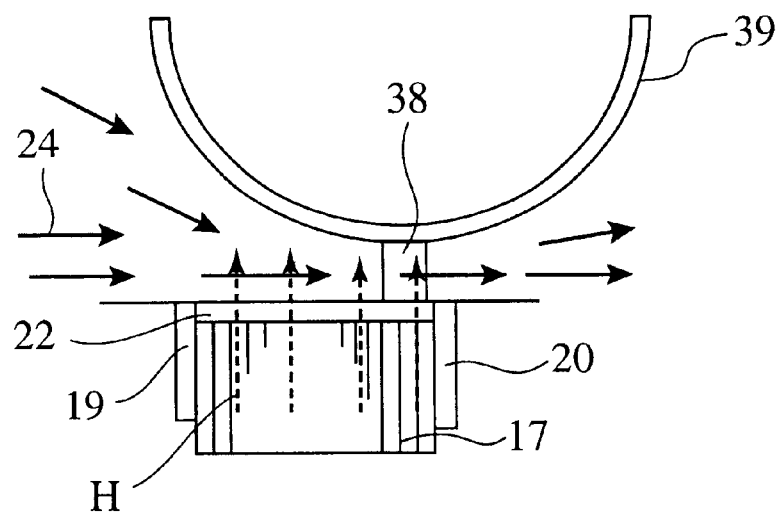
FIG. 23 is a sectional view, with portions broken away for clarity, of a plurality of heat dissipating units of a wind power generating device according to a third modification of the eleventh embodiment of the present invention.

FIG. 23 is a sectional view, with portions broken away for clarity, of a plurality of heat dissipating units of a wind power generating device according to a third modification of the eleventh embodiment of the present invention.

In this modification, as shown in FIG. 23, as compared with the wind power generating device of the first modification, the diameter of the cover 39 is gradually increased along the wind direction from the supporting bars 38 to the leeward side.

Therefore, the flow of the outside air 24, which is accelerated on the outer peripheral surface of the frame 22, is gradually decelerated and goes out from the outlet of the cover 39. In this case, because an open area of the space at the outlet of the cover 39 is large, the flow speed of the outside air 24 is decreased at the outlet of the cover 39. Therefore, the pressure loss of the outside air 24 at the outlet of the cover 39 is reduced so as to increase the flow speed of the outside air 24 which flows into the space between the cover 39 and the outer peripheral surface of the frame 22. Accordingly, a sufficient cooling performance for the generator 5 can be obtained.

Also, in this modification, because the top surface of the windward-side clamper 19, the top surface of the leeward-side clamper 20 and the outer peripheral surface of the frame 22 have the same height, the flow speed of the outside air 24, which flows into the space placed under the cover 39, is not lowered, and the outside air 24 can smoothly pass through the space along the outer peripheral surface of the frame 22.

Figure 24:
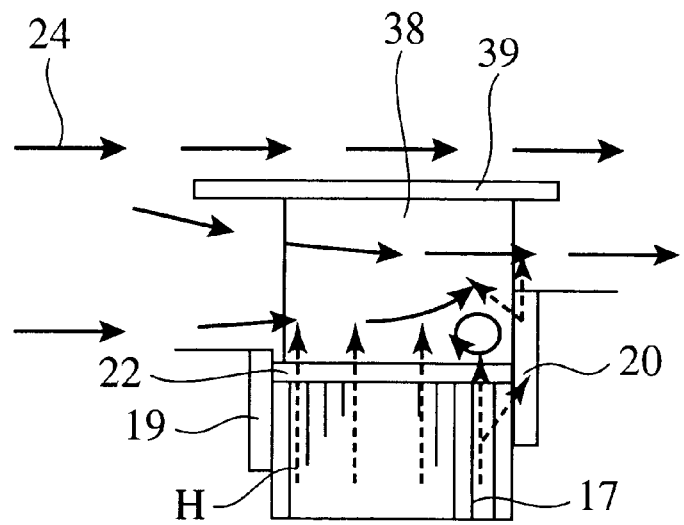
FIG. 24 is a sectional view, with portions broken away for clarity, of a plurality of heat dissipating units of a wind power generating device according to a fourth modification of the eleventh embodiment of the present invention.

FIG. 24 is a sectional view, with portions broken away for clarity, of a plurality of heat dissipating units of a wind power generating device according to a fourth modification of the eleventh embodiment of the present invention.

In this modification, as shown in FIG. 24, each supporting bar 38 is formed in a fin shape so as to extend in the axial direction of the frame 22. Therefore, the heat dissipating area of the supporting bars 38 is increased to promote the heat dissipation from the supporting bars 38, and a sufficient cooling performance for the generator 5 can be obtained.

Also, in the same manner as the wind power generating devices shown in FIG. 19 and FIG. 22, the top surface of the windward-side clamper 19 is slightly higher than the outer peripheral surface of the frame 22, and the top surface of the leeward-side clamper 20 is considerably higher than the outer peripheral surface of the frame 22. Therefore, the outside air 24, which flows into the space placed under the cover 39 and is accelerated, collides with the front portions (or the windward-side portions) of the supporting bars 38 and the leeward-side clamper 20. Accordingly, the heat dissipation from the outer peripheral surface of the frame 22, the supporting bars 38 and the leeward-side clamper 20 can be promoted.

In the fourth modification, the shape of the cover 39 is the same as that shown in FIG. 19, and the cover 39 is arranged in parallel to the outer peripheral surface of the frame 22. However, it is applicable that the cover 39 shown in FIG. 21 or FIG. 23 be arranged in the wind power generating device. In this case, because the outside air 24 can be efficiently supplied into the space between the cover 39 and the frame 22, the heat dissipation from the frame 22 can be more promoted.

Figure 25:
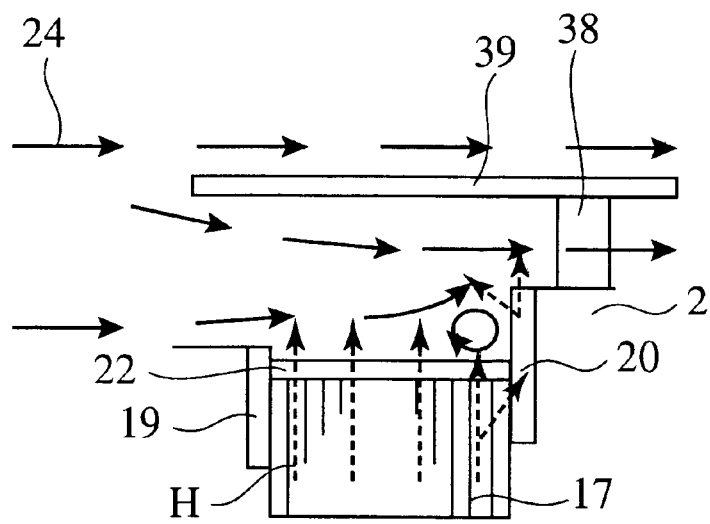
FIG. 25 is a sectional view, with portions broken away for clarity, of a plurality of heat dissipating units of a wind power generating device according to a fifth modification of the eleventh embodiment of the present invention.

FIG. 25 is a sectional view, with portions broken away for clarity, of a plurality of heat dissipating units of a wind power generating device according to a fifth modification of the eleventh embodiment of the present invention.

In this modification, as shown in FIG. 25, the supporting bars 38, of which the length is shortened as compared with that of the supporting bars 38 shown in FIG. 19, are arranged on a position of the nacelle 2 which is placed on the leeward side of the frame 22. Also, the length of the cover 39 is increased so as to cover the frame 22 and a part of the nacelle 2 placing the supporting bars 38.

Therefore, a part of the outside air 24, which collides with the front portions (or the windward-side portions) of the cover 39, flows into the space between the cover 39 and the frame 22, the flow speed of the outside air 24 is increased on the outer peripheral surface of the frame 22, the outside air 24 collides with the leeward-side clamper 20, and a part of the outside air 24, which is accelerated on the frame 22, is more accelerated when the part of the outside air 24 passes through a space between the cover 39 and the nacelle 2. Accordingly, the heat dissipation from the frame 22 and the leeward-side clamper 20 can be promoted.

Embodiment 12

Figure 26:
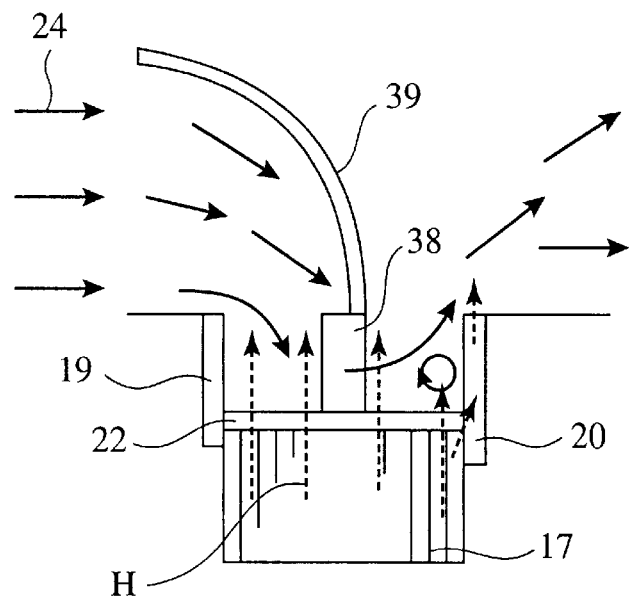
FIG. 26 is a sectional view, with portions broken away for clarity, of a plurality of heat dissipating units of a wind power generating device according to a twelfth embodiment of the present invention.
Figure 27:
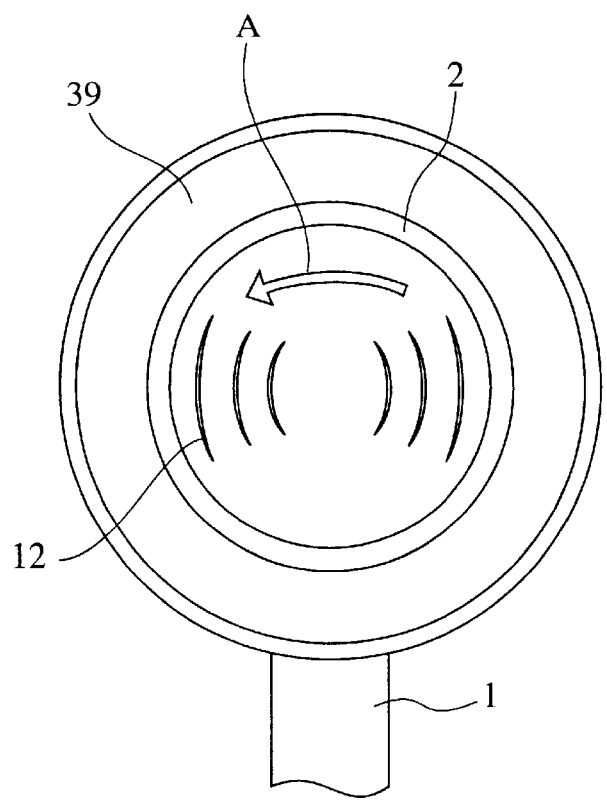
FIG. 27 is a front view of the wind power generating device shown in FIG. 26.

FIG. 26 is a sectional view, with portions broken away for clarity, of a plurality of heat dissipating units of a wind power generating device according to a twelfth embodiment of the present invention, and FIG. 27 is a front view of the wind power generating device shown in FIG. 26.

In a wind power generating device of a twelfth embodiment, no fin (or no pin) is arranged on the outer peripheral surface of the frame 22 in the same manner as in the eleventh embodiment. Also, as compared with the wind power generating device of the eleventh embodiment, the leeward end of the cover 39 is supported by the supporting bars 38 to make the leeward end of the cover 39 face the outer peripheral surface of the frame 22 through the supporting bars 38, and the diameter of the cover 39 is gradually decreased along the wind direction from the windward side to the leeward side. Also, the upper surface of the windward-side clamper 19 and the upper surface of the leeward-side clamper 20, of which the heights are the same as each other, are higher than the outer peripheral surface of the frame 22. Also, a space is formed between the leeward end of the cover 39 and the outer peripheral surface of the frame 22, and the outside air 24 passes through the space other than the supporting bars 38.

Next, an operation of the wind power generating device will be described below.

As shown in FIG. 26 and FIG. 27, the outside air 24, which collides with the cover 39, flows into the space between the cover 39 and the frame 22. In this case, because the outside air 24 flows along the surface of the cover 39, the flow direction of the outside air 24 is changed, and the outside air 24 flows toward the frame 22. Therefore, no vortex of the air flow due to the separation of a part of the outside air 24 on the leeward side of the windward-side clamper 19 is generated. Thereafter, the flow direction of the outside air 24 is changed to a direction parallel to the outer peripheral surface of the frame 22, and the outside air 24 passes along the outer peripheral surface of the frame 22 between the windward-side clamper 19 and the leeward-side clamper 20. Thereafter, the outside air 24 collides with the leeward-side clamper 20, and the heat exchange between the leeward-side clamper 20 and the outside air 24 is performed. Thereafter, the outside air 24 goes out to the leeward side of the cover 39.

As is described above, in the twelfth embodiment, because the outside air 24 passes along the outer peripheral surface of the frame 22, a high heat transfer coefficient between the frame 22 and the outside air 24 can be obtained, and a sufficient cooling performance for the generator 5 can be obtained.

Also, because the diameter of the cover 39 is large on the windward side, a large amount of outside air 24 can be collected to perform the heat exchange between the frame 22 and the outside air 24, and the heat dissipation can be efficiently performed in the wind power generating device.

Embodiment 13

Figure 28:
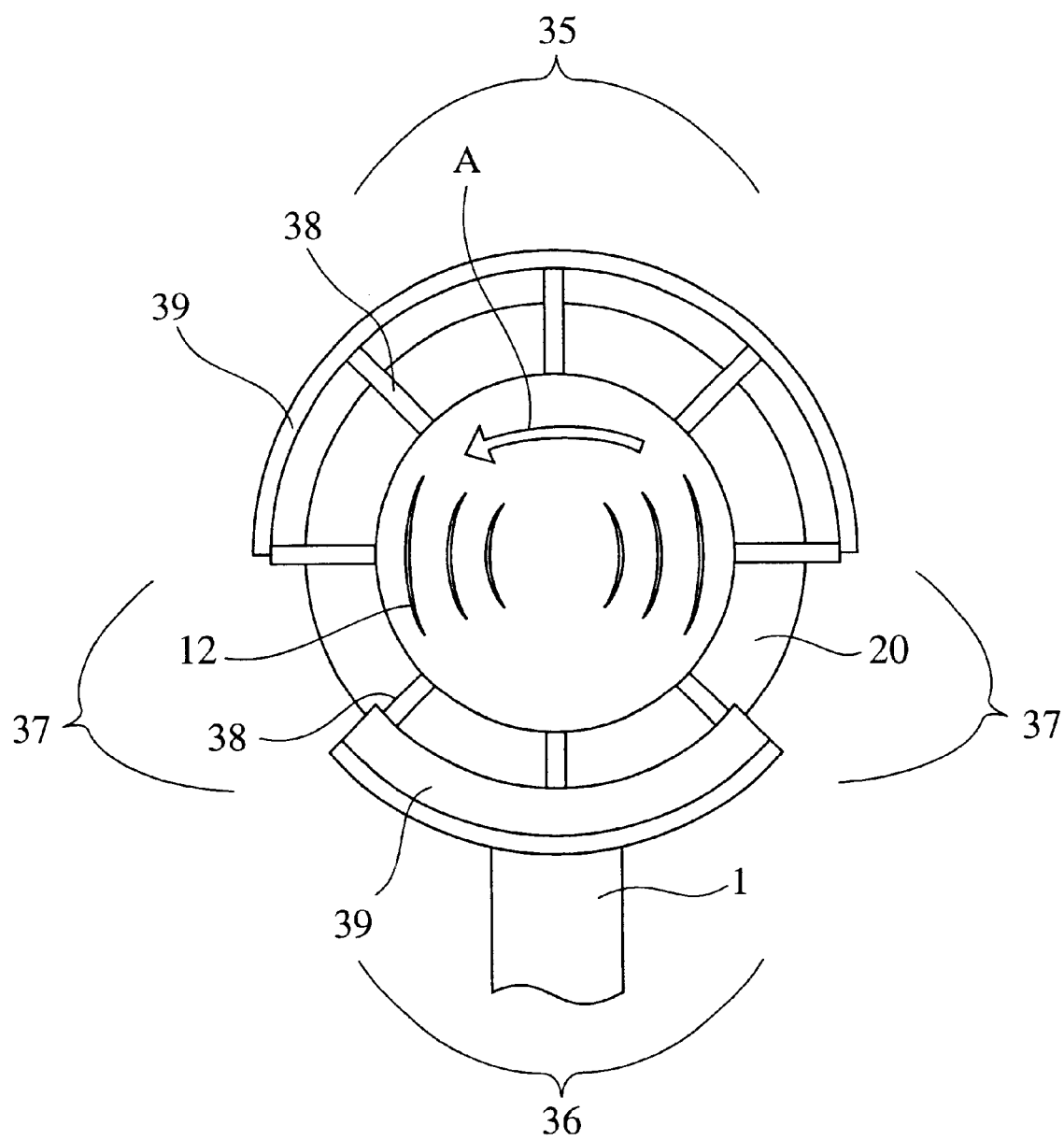
FIG. 28 is a front view, with portions broken away for clarity, of a plurality of heat dissipating units of a wind power generating device according to a thirteenth embodiment of the present invention.

FIG. 28 is a front view, with portions broken away for clarity, of a plurality of heat dissipating units of a wind power generating device according to a thirteenth embodiment of the present invention.

In a wind power generating device of a thirteenth embodiment, no fin (or no pin) is arranged on the outer peripheral surface of the frame 22 in the same manner as in the eleventh embodiment. Also, the frame 22 directly receives the solar radiation in the upper region 35, which is placed on the upper side of the outer peripheral surface of the frame 22, to heighten the heat load in the upper region 35. Therefore, the cylindrical cover 39 shown in FIG. 19 is arranged on the upper region 35 to prevent the frame 22 of the upper region 35 from receiving the solar radiation. Also, the flow speed of the outside air 24 is lowered in the neighborhood of the frame 22 by the pole 1 in the lower region 36 which is placed on the lower side of the outer peripheral surface of the frame 22. Therefore, the cover 39 shown in FIG. 21, FIG. 22 or FIG. 23, which has the large open area from the windward side to the supporting bars 38, is arranged in the lower region 36 to obtain a sufficient cooling performance for the generator 5. Also, in the side regions (or a below right side region and a below left region) 37 which are placed on both sides of the outer peripheral surface of the frame 22, the intensity of the solar radiation is weak, and the flow speed of the outside air 24 is not lowered by the pole 1. Therefore, no cover is arranged in the side regions 37.

Next, an operation of the wind power generating device will be described below.

As shown in FIG. 28, the cover 39 arranged in the upper region 35 prevents the frame 22 from receiving the solar radiation. Therefore, the increase of the temperature of the frame 22 is suppressed in the upper region 35. Also, because the cover 39 having the large open area from the windward side to the supporting bars 38 is arranged in the lower region 36, a large amount of outside air 24 flows into the area between the cover 39 and the frame 22. Therefore, the increase of the temperature of the frame 22 is suppressed in the lower region 36. Also, in the side regions 37, the intensity of the solar radiation is weak, and there is no influence of the pole 1. Therefore, even though the frame 22 is not covered, the increase of the temperature of the frame 22 is considerably low in the side regions 37.

As is described above, in the thirteenth embodiment, the increase of the heat load in the upper region 35 is decreased by the cover 39 shown in FIG. 19, and the heat dissipating performance in the lower region 36 can be improved by the cover 39 shown in FIG. 21, FIG. 22 or FIG. 23. Accordingly, a sufficient cooling performance for the generator 5 can be obtained.

Also, in the thirteenth embodiment, the covers 39 having various shapes and sizes can be arbitrarily arranged in the wind power generating device according to a designer's intention. Accordingly, a temperature distribution of the generator 5 can be arbitrarily set according to the designer's intention.

Embodiment 14

Figure 29:
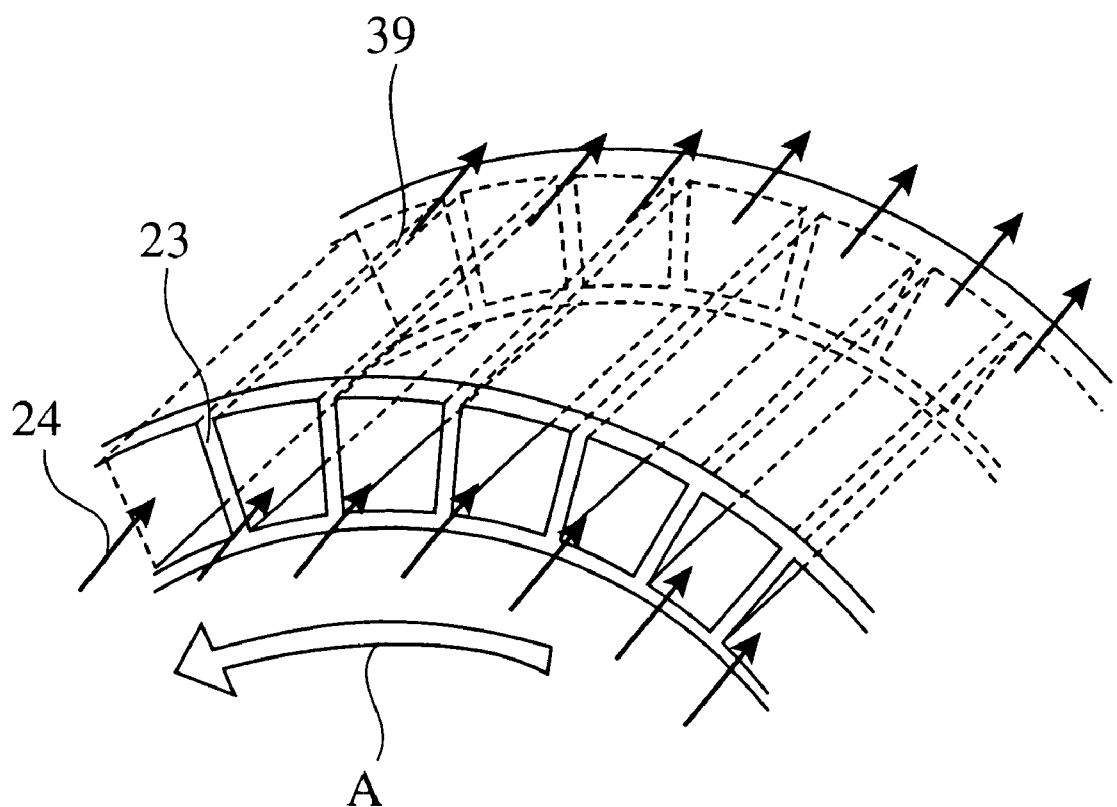
FIG. 29 is a sectional view, with portions broken away for clarity, of a plurality of heat dissipating units of a wind power generating device according to a fourteenth embodiment of the present invention.

FIG. 29 is a sectional view, with portions broken away for clarity, of a plurality of heat dissipating units of a wind power generating device according to a fourteenth embodiment of the present invention.

In a wind power generating device of a fourteenth embodiment, as compared with the first embodiment, the height of the upper surface of the windward-side clamper 19, the height of the upper surface of the leeward-side clamper 20 and the height of the outer peripheral surface of the frame 22 are set to be the same as each other. Also, the cylindrical cover 39 shown in FIG. 19 are arranged on the fins 23 which are arranged on the outer peripheral surface of the frame 22 at equal intervals. The cylindrical cover 39 are, for example, integrally formed with the fins 23 to promote the heat transfer from the fins 23 to the cylindrical cover 39 by conduction.

Next, an operation of the wind power generating device will be described below.

As shown in FIG. 29, the heat generated in the generator 5 is transferred by conduction to the fins 23 and the cover 39 through the frame 22. When the outside air 24 flows into a duct-shaped space which is surrounded by the frame 22, each pair of fins 23 adjacent to each other and the cover 39, the heat is dissipated from the outer peripheral surface of the frame 22, the outer surfaces of the fins 23 and the inner and outer peripheral surfaces of the cover 39 to the outside air 24.

As is described, in the fourteenth embodiment, the inner and outer peripheral surfaces of the cover 39 function as heat dissipating surfaces. Therefore, the heat dissipating area can be increased in the wind power generating device, and a sufficient cooling performance for the generator 5 can be obtained.

Also, in the fourteenth embodiment, the outside air 24 flows into each duct-shaped space surrounded by the frame 22, the fins 23 and the cover 39. Therefore, the flow speed of the outside air 24 can be increased because parts of the outside air 24 colliding with the front portions of the fins 23 and the cover 39 flow into the duct-shaped spaces, and the heat dissipation from the cover 39, the fins 23 and the frame 22 can be promoted.

In the fourteenth embodiment, the shape of the cover 39 is the same as that shown in FIG. 19, and the cover 39 is arranged in parallel to the outer peripheral surface of the frame 22. However, it is applicable that the cover 39 shown in FIG. 21 or FIG. 23 be arranged in the wind power generating device. In this case, because the outside air 24 can be efficiently supplied into each duct-shaped space between the cover 39, the fins 23 and the frame 22, the heat dissipation from the cover 39, the fins 23 and the frame 22 can be more promoted.

What is claimed is:

1. A wind power generating device comprising:
   a horizontal shaft arranged on top of a vertical pole and directed toward a windward side;
   a generator having a rotor fixed on a leeward side of the horizontal shaft and a stator arranged outside of the rotor;
   a blade fixed to the horizontal shaft on the windward side of the horizontal shaft and rotated by wind; and
   a cylindrical frame separating the stator of the generator from outside air and dissipating heat generated in the generator according to rotation of the rotor of the generator, to the wind that rotates the rotor via the blade.

2. The wind power generating device according to claim 1, wherein the cylindrical frame includes a fin which is outwardly arranged on the cylindrical frame in a radial direction of the cylindrical frame and extends in an axial direction of the cylindrical frame.

3. The wind power generating device according to claim 2, wherein an angle between an extending direction of a front portion of the fin on the windward side and a rotational direction of the blade is an acute angle.

4. The wind power generating device according to claim 2, wherein the fin includes a plurality of divided fins serially arranged in the axial direction of the cylindrical frame, and each pair of divided fins adjacent to each other are arranged at positions different from each other along a circumferential direction of the cylindrical frame.

5. The wind power generating device according to claim 4, wherein an angle between an extending direction of the divided fin on a windward side and a rotational direction of the blade is an acute angle.

6. The wind power generating device according to claim 2, further comprising:
   a windward-side clamper on a windward side of the cylindrical frame; and
   a leeward-side clamper on a leeward side of cylindrical frame with the stator of the generator between the windward-side clamper and the leeward-side clamper, wherein an upper surface of the windward-side clamper is even with an outer peripheral surface of the cylindrical frame, and the fin extends beyond an upper surface of the leeward-side clamper in the axial direction of the cylindrical frame.

7. The wind power generating device according to claim 2, further comprising:
   a windward-side clamper on a windward side of the cylindrical frame; and
   a leeward-side clamper on a leeward side of cylindrical frame with the stator of the generator between the windward-side clamper and the leeward-side clamper, wherein an upper surface of the windward-side clamper and an outer peripheral surface of the cylindrical frame are even with an upper surface of the leeward-side clamper in the axial direction of the cylindrical frame.

8. The wind power generating device according to claim 2, further comprising:
   a windward-side clamper on a windward side of the cylindrical frame; and
   a leeward-side clamper on a leeward side of cylindrical frame with the stator of the generator between the windward-side clamper and the leeward-side clamper, wherein an upper surface of the windward-side clamper and an upper surface of the leeward-side clamper extend beyond an outer peripheral surface of the cylindrical frame in the axial direction of the cylindrical frame, and the fin extends beyond the upper surface of the windward-side clamper and the upper surface of the leeward-side clamper in the axial direction of the cylindrical frame.

9. The wind power generating device according to claim 1, wherein the cylindrical frame includes a projection extending outwardly from the cylindrical frame in a radial direction of the cylindrical frame.

10. The wind power generating device according to claim 1, wherein the cylindrical frame includes a plurality of fins arranged at a pitch on an upper region of the cylindrical frame, where solar radiation is received, or on a lower region of the cylindrical frame influenced by the pole, and each fin protrudes from the cylindrical frame in a radial direction of the cylindrical frame and extends in an axial direction of the cylindrical frame.

11. The wind power generating device according to claim 1, wherein the cylindrical frame includes a plurality of fins on the cylindrical frame at various heights for dissipating heat, and each fin outwardly protrudes from the cylindrical frame in a radial direction of the cylindrical frame and extends in an axial direction of the cylindrical frame.

12. The wind power generating device according to claim 1, wherein the cylindrical frame includes an outer circumferential wall extending in a circumferential direction of the cylindrical frame for dissipating heat.

13. A wind power generating device comprising:
   a horizontal shaft arranged on top of a vertical pole and directed toward a windward side;
   a generator having a rotor fixed on a leeward side of the horizontal shaft and a stator outside of the rotor;
   a blade fixed to the horizontal shaft on the windward side of the horizontal shaft and rotated by wind; and
   a cylindrical frame separating the stator of the generator from outside air;
   a cover covering the cylindrical frame for leading the wind, which rotates the rotor of the generator via the blade, toward the cylindrical frame.

14. The wind power generating device according to claim 13, wherein a clearance between the cylindrical frame and the cover is gradually reduced in a windward direction from a front portion of the cover on a windward side to a portion of the cover proximate the cylindrical frame.

15. The wind power generating device according to claim 13, wherein a clearance between the cylindrical frame and the cover is gradually increased in a leeward direction from a portion of the cover proximate the cylindrical frame to a rear portion of the cover on a leeward side.

16. The wind power generating device according to claim 13, further comprising:
   a windward-side clamper on a windward side of the cylindrical frame; and
   a leeward-side clamper on a leeward side of cylindrical frame with the stator of the generator between the windward-side clamper and the leeward-side clamper, wherein an upper surface of the windward-side clamper and an outer peripheral surface of the cylindrical frame are even with an upper surface of the leeward-side clamper in the axial direction of the cylindrical frame.

17. The wind power generating device according to claim 16, further comprising a supporting bar, outwardly arranged on the cylindrical frame in a radial direction of the cylindrical frame and extending in an axial direction of the cylindrical frame, for supporting the cover by attaching the cover to a top portion of the supporting bar.

18. The wind power generating device according to claim 13, further comprising:
   a windward-side clamper on a windward side of the cylindrical frame; and
   a leeward-side clamper on a leeward side of cylindrical frame with the stator of the generator between the windward-side clamper and the leeward-side clamper, wherein an upper surface of the windward-side clamper and an outer peripheral surface of the cylindrical frame extend beyond an upper surface of the leeward-side clamper in the axial direction of the cylindrical frame.

19. The wind power generating device according to claim 18, further comprising a supporting bar, outwardly arranged on the cylindrical frame in a radial direction of the cylindrical frame and extending in an axial direction of the cylindrical frame, for supporting the cover.

20. The wind power generating device according to claim 13, wherein the cover is arranged on an upper region of the cylindrical frame, where solar radiation is received, or on a lower region of the cylindrical frame influenced by the pole.

* * * * *